United States Patent [19]

Iyoda

[11] Patent Number: 5,740,041
[45] Date of Patent: Apr. 14, 1998

[54] VEHICLE OCCUPANT RESTRAINT SYSTEM RESPONSIVE TO ACCELLERATION

[75] Inventor: Motomi Iyoda, Seto, Japan

[73] Assignee: Toyota Jidosha Kabushiki Kaisha, Toyota, Japan

[21] Appl. No.: 545,225

[22] Filed: Oct. 19, 1995

[30] Foreign Application Priority Data

Oct. 25, 1994 [JP] Japan ................. 6-260528

[51] Int. Cl.$^6$ ........................... B60R 21/32; G01P 15/00
[52] U.S. Cl. ..................... 364/424.055; 364/424.056; 364/424.055; 364/246.1; 180/271; 180/282; 280/735; 307/10.1
[58] Field of Search ............. 364/424.055, 424.056, 364/424.057, 460, 461; 280/728, 734, 735; 180/268, 232, 271, 282; 307/10.1, 9.1; 340/436

[56] References Cited

U.S. PATENT DOCUMENTS

| | | | |
|---|---|---|---|
| 4,243,248 | 1/1981 | Scholz et al. | 280/735 |
| 4,836,024 | 6/1989 | Woehrl et al. | 280/735 |
| 4,985,835 | 1/1991 | Sterler et al. | 364/424.055 |
| 5,083,276 | 1/1992 | Okano et al. | 364/424.055 |
| 5,173,614 | 12/1992 | Woehrl et al. | 307/10.1 |
| 5,202,831 | 4/1993 | Blackburn et al. | 280/734 |
| 5,234,228 | 8/1993 | Morota et al. | 364/424.055 |
| 5,338,062 | 8/1994 | Kiuchi et al. | 180/282 |
| 5,484,166 | 1/1996 | Mazur et al. | 340/436 |
| 5,504,569 | 4/1996 | Kato et al. | 180/169 |
| 5,513,109 | 4/1996 | Fujishima | 364/424.055 |

FOREIGN PATENT DOCUMENTS

| | | |
|---|---|---|
| 0 528 514 | 2/1993 | European Pat. Off. . |
| 4-500642 | 2/1992 | Japan . |
| 5-139226 | 6/1993 | Japan . |
| 5-193439 | 8/1993 | Japan . |
| 6-001199 | 1/1994 | Japan . |
| 6-055993 | 3/1994 | Japan . |
| 6-056000 | 3/1994 | Japan . |
| WO 90/03289 | 4/1990 | WIPO . |
| WO 93/09008 | 5/1993 | WIPO . |

OTHER PUBLICATIONS

Patent Abstracts of Japan, vol. 018, No. 478 (P-1796), Sep. 6, 1994 & JP-A-06 160525 (Olympus Optical Co Ltd), Jun. 7, 1994.

Patent Abstracts of Japan, vol. 016, No. 220 (P-1358), May 22, 1992 & JP-A-04 043938 (Hitachi Ltd), Feb. 13, 1992.

*Primary Examiner*—Tan Q. Nguyen
*Attorney, Agent, or Firm*—Cushman Darby & Cushman IP Group of Pillsbury Madison & Sutro LLP

[57] ABSTRACT

An occupant restraint system for a vehicle. The system is actuated based on sensed acceleration due to external forces operating on the vehicle. Vectors representing components of external forces are established. A synthesized vector is formed by combining them and calculations are made based on the synthesized vector. Comparison is made to predetermined thresholds to determine whether to deploy the restraint system.

9 Claims, 23 Drawing Sheets

FIG.6

| NO | CALCULATION VALUE | MAGNITUDE OF EXTERNAL FORCE | DIRECTION OF EXTERNAL FORCE | REMARKS |
|---|---|---|---|---|
| 1 | $G_x, G_y$ | $\sqrt{G_x^2 + G_y^2}$ | $\tan^{-1} \dfrac{G_y}{G_x}$ | |
| 2 | $V_x, V_y$ | $\sqrt{V_x^2 + V_y^2}$ | $\tan^{-1} \dfrac{V_y}{V_x}$ | $V = \int G\,dt$ |
| 3 | $S_x, S_y$ | $\sqrt{S_x^2 + S_y^2}$ | $\tan^{-1} \dfrac{S_y}{S_x}$ | $S = \iint G\,dt$ |
| | ----- | ----- | ----- | ----- |
| n | $f_x, f_y$ | $\sqrt{f_x^2 + f_y^2}$ | $\tan^{-1} \dfrac{f_y}{f_x}$ | $f = f(G)$ |

FIG. 30

| fx \ fy | -1.0 | ... | -0.5 | ... | 0 | ... | 0.5 | ... | 1.0 |
|---|---|---|---|---|---|---|---|---|---|
| 1.0 | ON | | ON | | ON | | ON | | ON |
| | ON | | ON | | OFF | | ON | | ON |
| | ON | | ON | | OFF | | ON | | ON |
| | ON | | ON | | OFF | | ON | | ON |
| | ON | | ON | | OFF | | ON | | ON |
| | ON | | ON | | OFF | | ON | | ON |
| | ON | | OFF | | OFF | | OFF | | ON |
| | ON | | OFF | | OFF | | OFF | | ON |
| | ON | | OFF | | OFF | | OFF | | ON |
| | ON | | OFF | | OFF | | OFF | | ON |
| | ON | | OFF | | OFF | | OFF | | ON |
| | OFF | | OFF | | OFF | | OFF | | OFF |
| 0 | OFF | | OFF | | OFF | | OFF | | OFF |

VEHICLE OCCUPANT RESTRAINT SYSTEM RESPONSIVE TO ACCELLERATION

BACKGROUND OF THE INVENTION

1) Field of the Invention

The present invention generally relates to an occupant restraint system for a vehicle and, more particularly, to an occupant restraint system for restraining passengers in a vehicle when an acceleration exceeding a predetermined value is generated in the vehicle.

2) Description of the Related Art

Occupant restraint systems used in a vehicle, such as an airbag system or an preloader of a seat belt, are well known in the art. Such systems are actuated for restraining passengers against their seats when an acceleration exceeding a predetermined value is generated in the vehicle. An appropriate position of the passengers is maintained when the occupant restraint systems are actuated.

An occupant restraint system such as an airbag system must be actuated only when the restraint of passengers is truly needed. The case in which the passengers must be restrained is when the passengers cannot maintain their position by their own accord. Such a condition can occur when a large external force is exerted on the vehicle against the direction of travel.

Additionally, the passengers must be restrained when a relatively large force is applied from a side of the vehicle, that is, a relatively large acceleration is generated in a lateral (side-to-side) direction of the vehicle. In such a case, no significant acceleration is generated in the vehicle in a longitudinal (front-to-rear) direction of the vehicle.

Accordingly, in order to perform an appropriate determination for actuating the occupant restraint system, both the acceleration generated in the longitudinal direction and that in the lateral direction must be taken into consideration.

Such an occupant restraint system is disclosed in Japanese Laid-Open Patent Application No. 6-56000. This system measures a front-to-rear component Gx and a side-to-side component Gy of the acceleration generated in the vehicle. The two components are synthesized to obtain a synthesized vector and the magnitude F and direction $\Theta$ of the synthesized vector is calculated. A threshold value $Fth(\Theta)$ is then obtained for the direction $\Theta$. It is then determined whether the magnitude F is greater than the threshold value $Fth(\Theta)$ which corresponds to the direction $\Theta(F>Fth(\Theta))$. When the above condition is met, an airbag system is actuated. In this system, the actuation of the airbag system is determined based on the direction of the force exerted on the vehicle as well as the magnitude of the force. Thus, an appropriate determination on the actuation can always be made regardless of direction of the force exerted on the vehicle.

The above-mentioned conventional occupant restraint system must calculate the direction $\Theta$ and the threshold value $Fth(\Theta)$ corresponding to the direction $\Theta$ each time an external force is exerted on the vehicle. In order to obtain the threshold value $Fth(\Theta)$, an appropriate equation must be provided so as to perform a complex calculation operation. That is, this system has a problem in that many operations must be performed before determining an actuation of the system. From this point of view, the above-mentioned conventional occupant restraint system is not practical in actual use.

SUMMARY OF THE INVENTION

It is a general object of the present invention to provide an improved and useful occupant restraint system for a vehicle in which the above-mentioned problem is eliminated.

A more specific object of the present invention is to provide an occupant restraint system in which a determination on the actuation of the system is made by performing a simple operation.

In order to achieve the above-mentioned objects, there is provided according to one aspect of the present invention, as shown in FIG. 1 which depicts a principle of the present invention, an occupant restraint system for a vehicle, an acceleration being generated on the vehicle when an external force is exerted on the vehicle, the occupant restraint system comprising:

restraining means (M5) for restraining a passenger in said vehicle when the external force exceeds a predetermined value;

external force assuming means (M1, M2, M3) for assuming a magnitude and a direction of the external force exerted on the vehicle;

projective magnitude calculating means (M4) for calculating a projective magnitude of a projective vector obtained from an external force vector corresponding to the external force, the external force vector obtained from the magnitude and the direction assumed by the external force assuming means, the projective vector being a projection of the external force vector with respect to a predetermined direction; and actuation determining means (M6) for determining actuation of the restraining means by comparing the projective magnitude with a predetermined threshold value so that the restraining means is actuated when the projective magnitude is greater than the predetermined threshold value.

The external force assuming means comprises:

first feature value extracting means (M1) for extracting a first feature value from a first component of the acceleration in a first direction, the first feature value representing a first vector of the external force with respect to the first direction;

second feature value extracting means (M2) for extracting a second feature value from a second component of the acceleration in a second direction different from the first direction, the second feature value representing a second vector of said external force with respect to the second direction; and synthesized vector calculating means (M3) for calculating a magnitude and a direction of a synthesized vector which is obtained by synthesizing the first vector and the second vector, the synthesized vector corresponding to the external force vector.

In the above-mentioned invention, the projective magnitude of the synthesized vector, which represents the magnitude of a component of a vector corresponding to the acceleration caused by the external force exerted on the vehicle with respect to the predetermined direction, is easily obtained. This is done by simple calculation in accordance with the magnitude and direction of the synthesized vector which is calculated by using the first feature value and the second feature value. Since the determination of the actuation of the restraining means is simply made by comparing the projective magnitude with a predetermined threshold value, a precise determination can be made with simple calculation.

In the above-mentioned invention, the projective magnitude calculating means (M4) may calculate the projective magnitude for a plurality of predetermined directions, and the actuation determining means (M6) compares each projective magnitude with the corresponding threshold value determined for each of the directions, a determination to actuate the restraining means (M5) being made when the projective magnitude exceeds the corresponding threshold value in any one of the predetermined directions. If a direction of the external force exerted on the vehicle is oblique to the front-to-rear direction, a rotational force is generated in the vehicle. This causes a difference in the initial stage of acceleration between the left side and the right side of the vehicle. That is, acceleration at an initial stage on one of the sides is relatively greater than that on the other side. Since the actuation determining means (M6) actuates the restraining means (M5) when the projective magnitude exceeds the corresponding threshold value at any one of the predetermined directions, the determination can be made in a short time.

Additionally, there is provided according to another aspect of the present invention, as shown in FIG. 2 which depicts a principle of the present invention, an occupant restraint system for a vehicle, an acceleration being generated on the vehicle when an external force is exerted on the vehicle, the occupant restraint system comprising:

restraining means (M5) for restraining a passenger in the vehicle when the external force exceeds a predetermined value;

first feature value extracting means (M7) for extracting a first feature value from a first component of the acceleration in a front-to-rear direction of the vehicle;

second feature value extracting means (M9) for extracting a second feature value from a second component of the acceleration in a side-to-side direction of the vehicle;

actuation determining means (M8) for determining actuation of the restraining means when the first feature value is greater than a predetermined threshold value; and threshold value changing means (M10) for changing the predetermined threshold value to an appropriate value in accordance with the second feature value, the threshold value being decreased as an absolute value of the second feature value is increased.

According to the present invention, the determination of the actuation of the restraining means (M5) can be made by simply comparing the first feature value with the predetermined threshold value. There is no need to calculate the synthesized vector or the threshold value in a particular direction. Thus, precise determination can be made by a simple operation without performing a complex calculation.

Other objects, features and advantages of the present invention will become more apparent from the following detailed description when read in conjunction with the accompanying drawings.

BRIEF DESCRIPTION OF THE DRAWINGS

FIG. 6 is an illustration for explaining a method for calculating feature values;

FIG. 30 is an illustration showing a table prepared for determining the actuation of airbags in accordance with feature values.

DETAILED DESCRIPTION OF THE PREFERRED EMBODIMENTS

Figure 1:
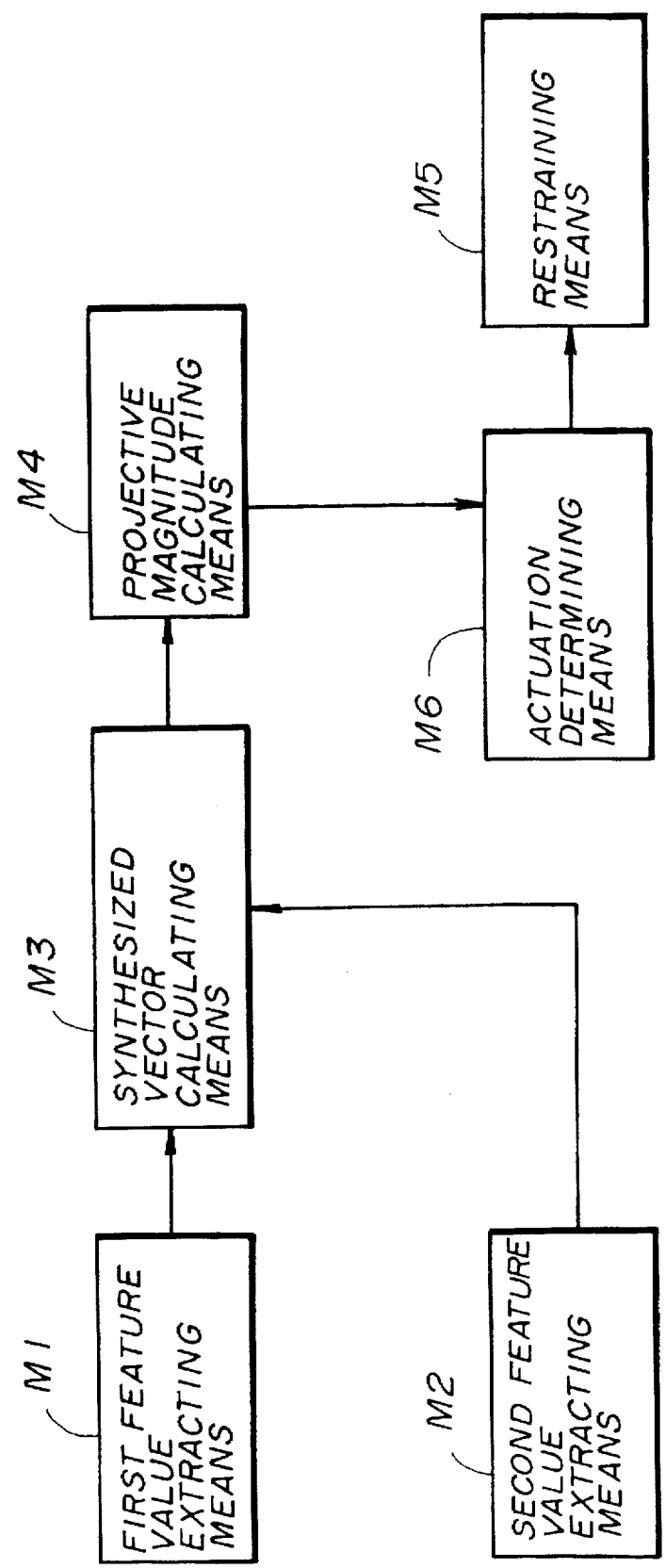
FIG. 1 is a block diagram for explaining a principle of an occupant restraint system according to one aspect of the present invention.
Figure 2:
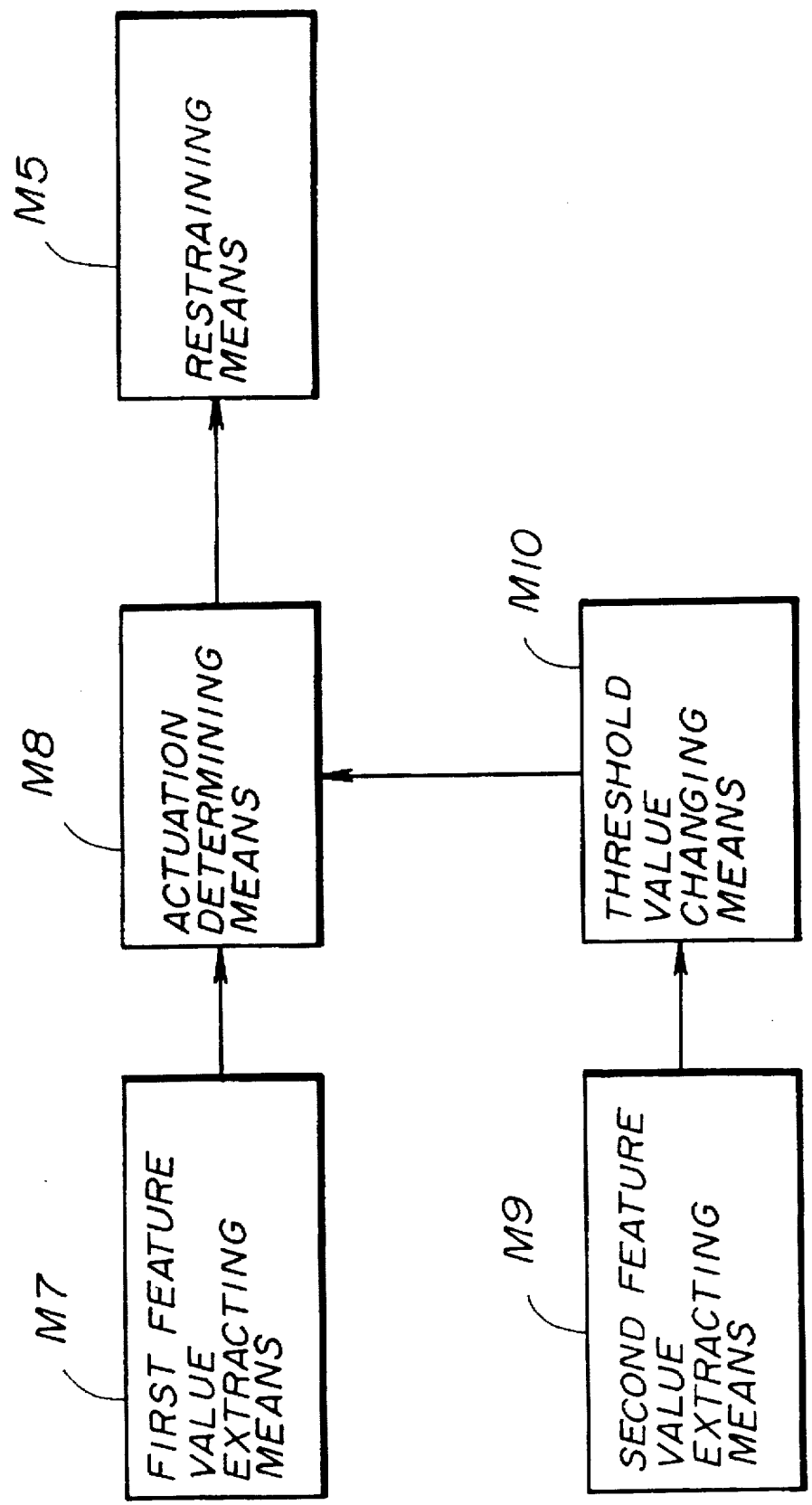
FIG. 2 is a block diagram for explaining a principle of an occupant restraint system according to another aspect of the present invention.
Figure 3:
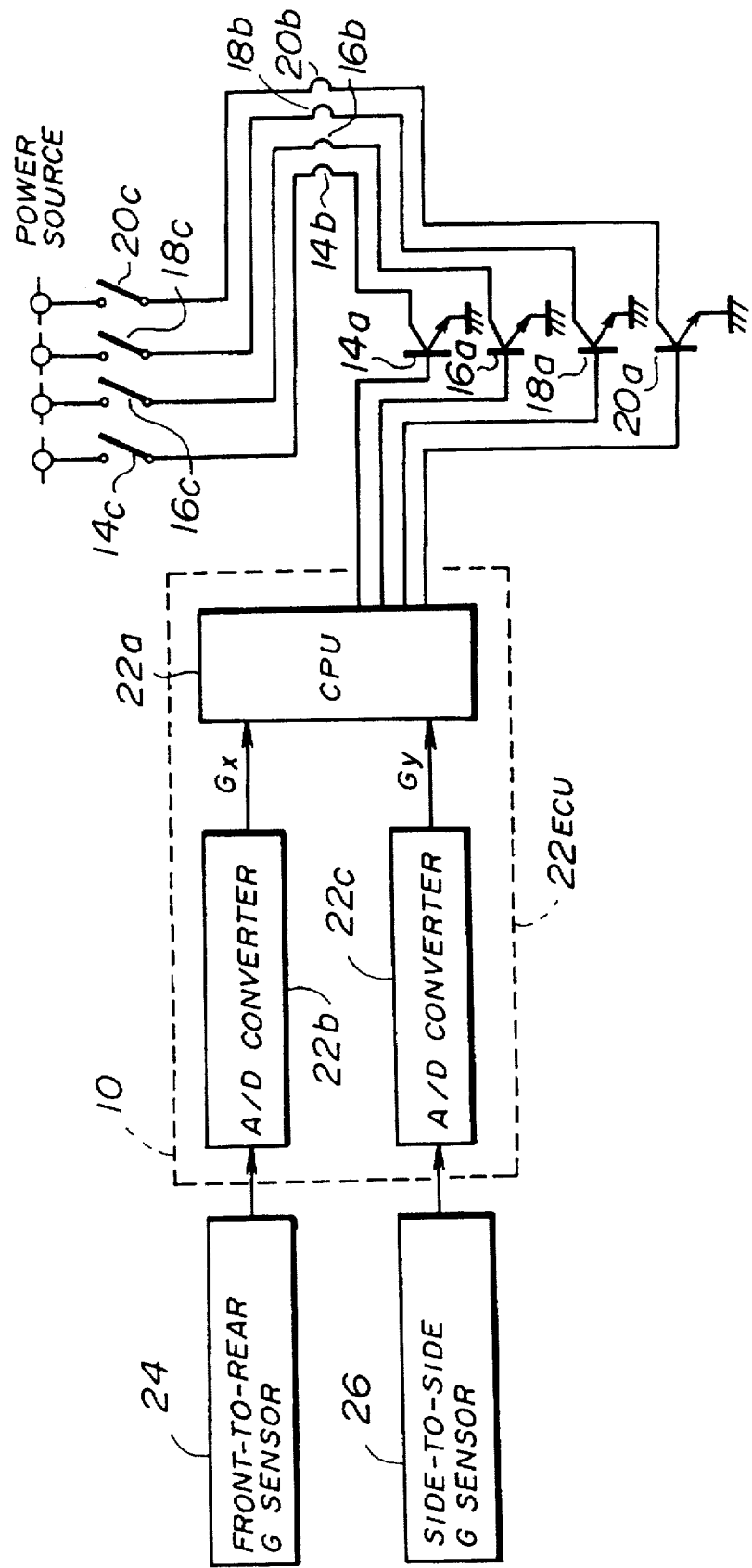
FIG. 3 is a block diagram of an occupant restraint system according to a first embodiment of the present invention.
Figure 4:
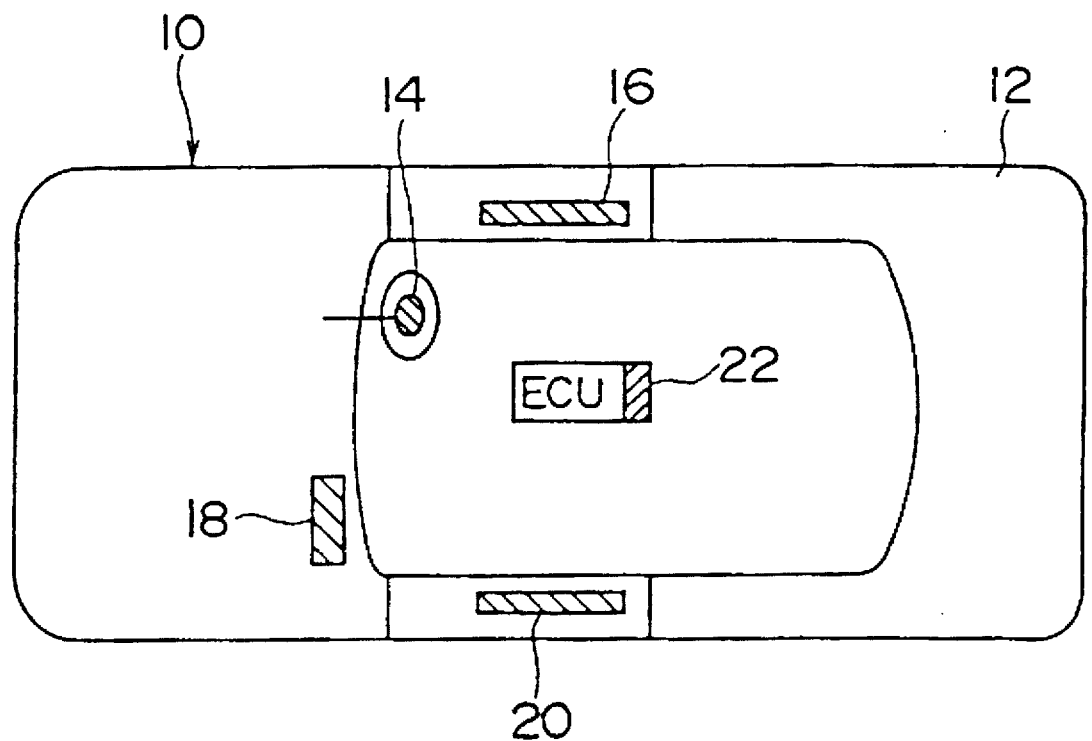
FIG. 4 is an illustration for explaining the structure of the entire system shown in FIG. 3.

A description will now be given, with reference to FIGS. 3 and 4, of a structure of a first embodiment of the present invention. FIG. 3 is a block diagram of an occupant restraint system 10 according to the first embodiment of the present invention. FIG. 4 is an illustration for explaining the structure of the entire system shown in FIG. 3.

As shown in FIG. 4, the occupant restraint system 10 is provided on a vehicle 12. The occupant restraint system 10 has airbags 14, 16, 18 and 20 which are inflated for restraining passengers seated in the vehicle 12. The airbags 14 and 16 are provided for a driver's seat. The airbag 14 is accommodated inside the center pad of a steeling wheel, and the airbag 16 is accommodated inside the door panel on the driver side. The airbags 18 and 20 are provided for a front passenger seat. The airbag 18 is located under a dash board, and the airbag 20 is accommodated inside the door panel on the passenger side.

An electronic control unit (ECU) 22 is provided in the vehicle 12 for controlling the actuation of the airbags 14, 16, 18 and 20. The ECU 22 comprises, as shown in FIG. 3, a central processing unit (CPU) 22a and analog to digital (A/D) converters 22b and 22c. A front-to-rear G sensor 24, which senses a front-to-rear component of the acceleration generated in the vehicle 12, is connected to the A/D converter 22b. A side-to-side G sensor 26, which senses a side-to-side component of the acceleration generated in the vehicle 12, is connected to the A/D converter 22c.

Switching elements 14a, 16a, 18a and 20a are connected to the CPU 22. These switching elements constitute a part of a driving circuit of the airbags 14, 16, 18 and 20. Squibs 14b, 16b, 18b and 20b, which initiate inflation of the airbags, are connected to the switching elements 14a, 16a, 18a and 20a, respectively. The squibs 14b, 16b, 18b and 20b are connected to safety sensors 14c, 16c, 18c and 20c, respectively. The safety sensors 14c, 16c, 18c and 20c are connected to the respective power source. Each of the safety sensors 14c, 16c, 18c and 20c is a mechanical sensor comprising a spring and a weight which is moved by inertia. If a deceleration exceeding a predetermined value is generated in the vehicle 12, an electrical contact in each of the safety sensors 14c, 16c, 18c and 20c is closed.

In the above-mentioned structure of the present embodiment, if a driving signal is supplied to the switching elements 14a, 16a, 18a and 20a while a deceleration is generated, the magnitude of which is such that the electrical contact of each of the safety sensors 14c, 16c, 18c and 20c is closed, a predetermined current flows to each of the squibs 14b, 16b, 18b and 20b. This actuates each of the squibs 14b, 16b, 18b and 20 and, thus, the airbags 14, 16, 18 and 20 are inflated. The purpose of providing the mechanical sensors in the driving circuit is to prevent an undesired actuation of the airbags due to an erroneous operation of the electronic circuit caused by a noise.

It should be noted that the occupant restraint system 10 according to the first embodiment of the present invention determines the actuation of the airbags 14, 16, 18 and 20 by considering the direction of an external force exerted on the vehicle 12. That is, the present embodiment protects passengers from being injured regardless of direction in which the external force is applied to the vehicle 12.

Figure 5:
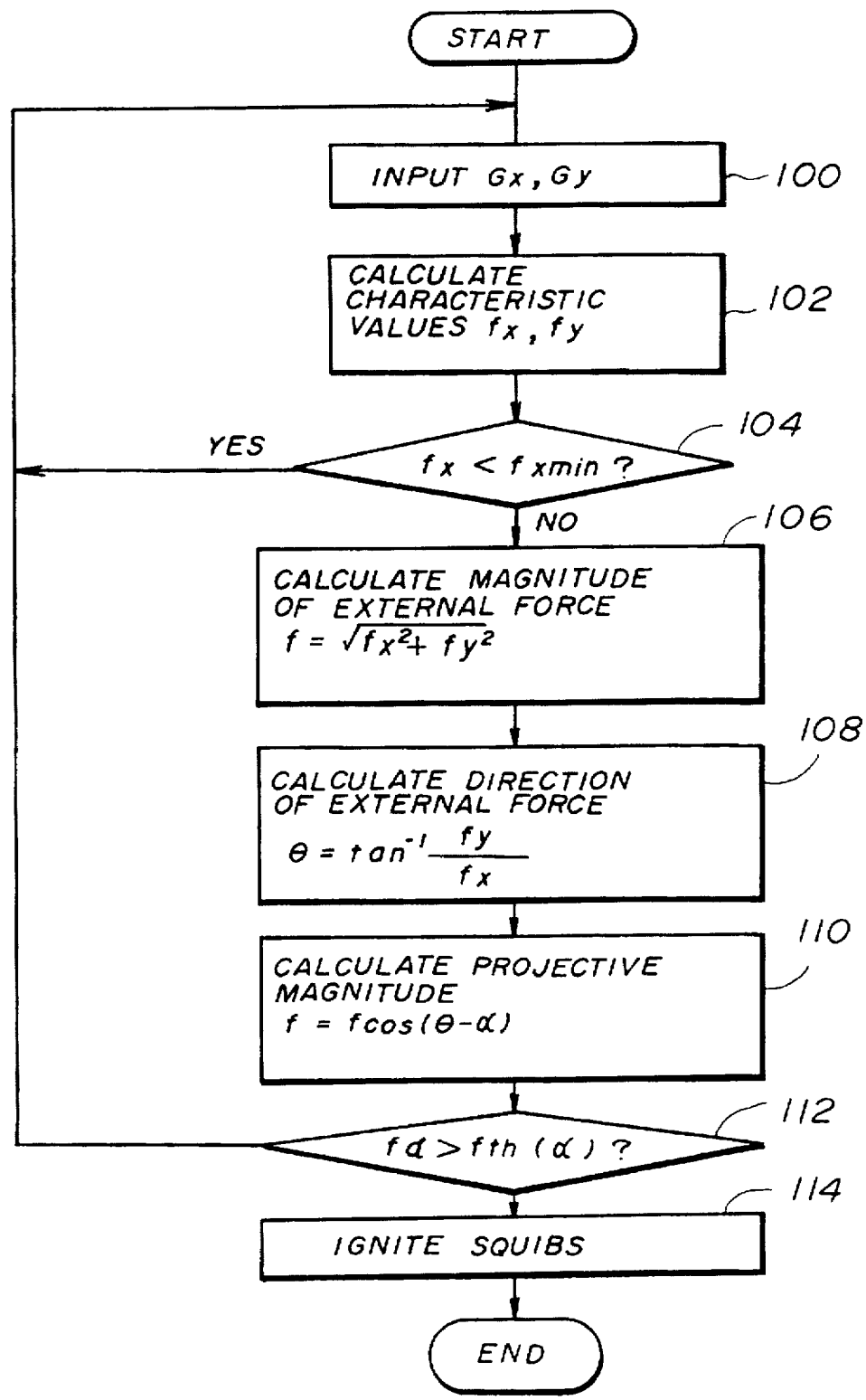
FIG. 5 is a flowchart of a process performed by a CPU shown in FIG. 3.

FIG. 5 is a flowchart of a process performed by the CPU 22a so as to achieve the above-mentioned function. This process is performed to actuate the airbags 14, 16, 18 and 20 when an acceleration exceeding a predetermined threshold value is generated in a predetermined direction.

When the routine shown in FIG. 5 is started, a front-to-rear component Gx and a side-to-side component Gy of the acceleration generated in the vehicle 12 are input, in step 100, to the respective front-to-rear G sensor 24 and the side-to-side G sensor 26.

In step 102, feature values fx and fy are calculated for the respective components Gx and Gy. The determination whether the airbags 14, 16, 18 and 20 are actuated should be made based on the magnitude and direction of an external force exerted on the vehicle 12. The values used for the determination are not limited to the components Gx and Gy, and other values which substantially represent the components Gx and Gy of the acceleration may be used. The feature values fx and fy calculated in step 102 correspond to such values.

That is, as shown in FIG. 6, when an acceleration G (Gx, Gy) is generated in the vehicle 12, the feature of the acceleration G is related to the velocity V (Vx, Vy) and the displacement S (Sx, Sy) and further related to the feature value f (fx, fy). The velocity V is obtained by an integral of the acceleration G. The displacement S is obtained by a double integral of the acceleration G. The feature value f is obtained by n times integral of the acceleration G.

In this case, an easier calculation can be made when the feature value f is used rather than the case in which the value of the acceleration G is directly used. The magnitude and direction of the external force which causes the acceleration G is represented by "$(fx^2+fy^2)^{1/2}$" and "$\tan^{-1}(fx/fy)$", respectively, as shown in FIG. 6. In the present embodiment, the velocity V, which is obtained by an integration of the acceleration G, is used as the feature value f.

The feature value f can be obtained by integrating the outputs Gx and Gy of the front-to-rear G sensor 24 and the side-to-side G sensor 26. Additionally, the feature value f may be obtained by an interval integral of the outputs Gx and Gy for a predetermined time interval dt, or by filtering the outputs Gx and Gy with a low-pass filter. When the feature value f is used, a stable result of the calculation is obtained since a high-frequency oscillation component of the output Gx and Gy is eliminated in the feature value f. This allows the feature value f to reflect a variation of the acceleration during a short time interval. Thus, a quick response as a result of the calculation is achieved.

In step 104, it is determined whether or not the x-component of the feature value f is less than a lower limit guard value fxmin. In this process, since the direction of the external force is determined by a calculation "$\tan^{-1}(fx/fy)$", the determination in step 104 is made. If the x-component fx is less than the lower limit guard value fxmin, the result of the feature calculation may be diverged. Accordingly, if it is determined that the x-component fx is less than the lower limit guard value fxmin, the routine returns to step 100. The routine proceeds to step 106 only when the determination in step 104 is negative.

In step 106, the magnitude of the external force exerted on the vehicle 12 is determined by a calculation in accordance with the equation "$f=(fx^2+fy^2)^{1/2}$". In step 108, the direction of the external force is determined by a calculation in accordance with the equation "$\Theta=\tan^{-1}(fy/fx)$".

Figure 7:
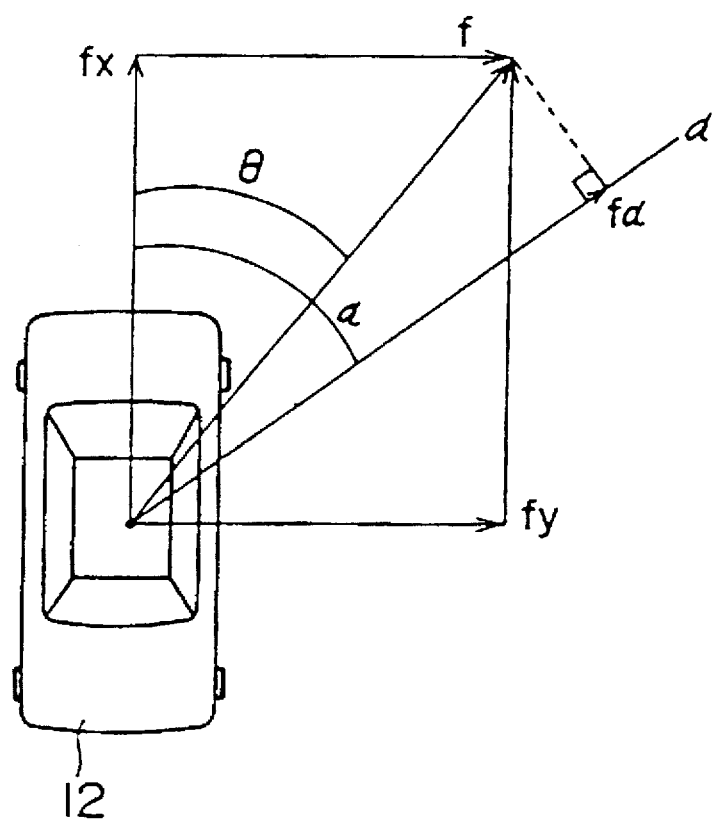
FIG. 7 is an illustration for explaining a method for obtaining a projective magnitude in a predetermined direction.

Thereafter, the routine proceeds to step 110 in which the magnitude $f\alpha$ (hereinafter referred to as a projective magnitude) of the projected vector of the external force with respect to a predetermined direction. In the present embodiment, as shown in FIG. 7, the predetermined direction (hereinafter referred to as the $\alpha$-direction) is defined as a direction of $\alpha$ degree with respect to the front-to-rear direction of the vehicle 12. Accordingly, the projective magnitude $f\alpha$ of the external force is obtained by a simple calculation in accordance with the equation "$f\alpha=f\cos(\Theta-\alpha)$".

In step 112, it is determined whether or not the projective magnitude $f\alpha$ is greater than a predetermined threshold value $fth(\alpha)$. The threshold value $fth(\alpha)$ is determined by experiments on the assumption that the passengers in the vehicle must be restrained if the magnitude of an external force applied in the $\alpha$-direction is equal to the threshold value $fth(\alpha)$. Accordingly, if it is determined, in step 112, that the projective magnitude $f\alpha$ is not greater than the predetermined threshold value $fth(\alpha)$, the routine returns to step 100 without actuating the airbags 14, 16, 18 and 20.

On the other hand, if it is determined, in step 112, that the projective magnitude $f\alpha$ is greater than the predetermined threshold value $fth(\alpha)$, the routine proceeds to step 114. In step 114, the squibs 14b, 16b, 18b and 20b are ignited since the determination in step 112 indicates that the passengers in the vehicle 12 must be restrained, and then the routine is ended.

As mentioned above, in the present embodiment, the determination whether or not an acceleration is generated in an arbitrary direction (the $\alpha$-direction), which determination must be reflected to the inflation of the airbags, is made by a simple process. Thus an appropriate and precise determination on the actuation of the airbags 14, 16, 18 and 20 can be made in a short time.

Although the occupant restraint system 10 has the four airbags in total, the airbag 20 which is located on the passenger side is not required to be inflated, for example, when an external force is exerted on the vehicle 20 from the driver side. In this embodiment, since the direction $\Theta$ of the external force is obtained in step 108, it can be easily determined as to which airbags, among the airbags 14, 16, 18 and 20, are to be inflated in accordance with the direction $\Theta$. Accordingly, in step 114, only squibs selected from among the squibs 14b, 16b, 18b and 20b may be ignited, the selection being made in accordance with the direction $\Theta$.

In order to make a precise determination on the actuation of the airbags, it is effective to sense the generation of acceleration which exceeds the threshold value in various directions. That is, the threshold value $fth(\alpha)$ is determined for each direction shown in FIG. 8. If an acceleration exceeding the corresponding threshold value $fth(\alpha)$ is generated, the airbags 14, 16, 18 and 20 are inflated. In this manner, when a condition to restrain the passengers in the vehicle 12 is established in any one of the directions, the determination to actuate the airbags is ensured.

Figure 8:
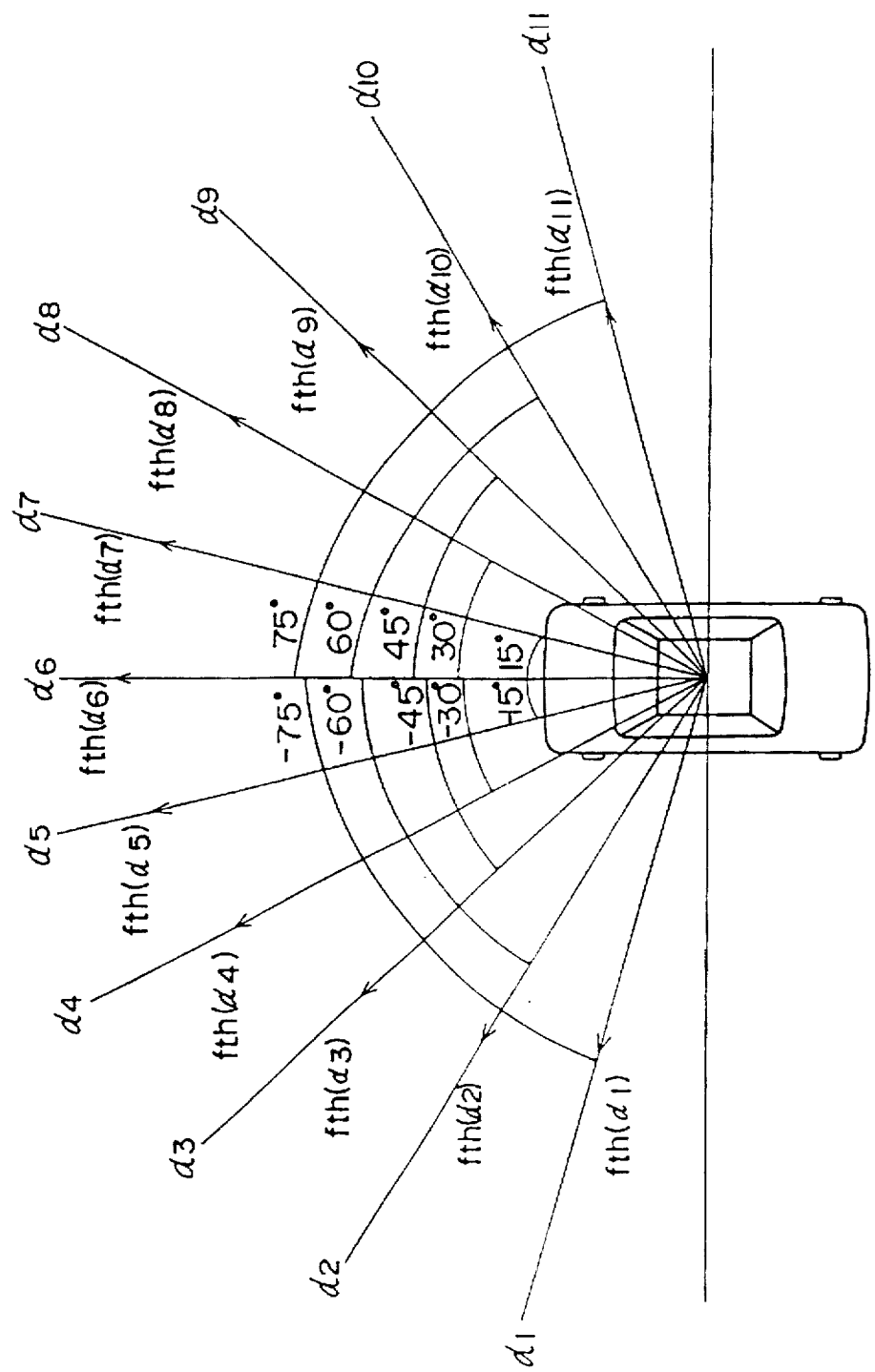
FIG. 8 is an illustration showing an example of threshold value determined for each projective direction.

It should be noted that the example shown in FIG. 8 is provided with eleven directions (hereinafter referred to as $\alpha n$) from the angle $\alpha=-75°$ to the angle $\alpha=+75°$ with an interval of 15°. The threshold values $fth(\alpha n)$ are indicated along the corresponding directions $\alpha n$. In FIG. 8, the threshold value $fth(\alpha n)$ is decreased as the absolute value of the angle $\alpha$ is increased. This is because the airbags should be inflated with a less magnitude of an external force when the external force is exerted from a side of the vehicle 12.

Figure 9:
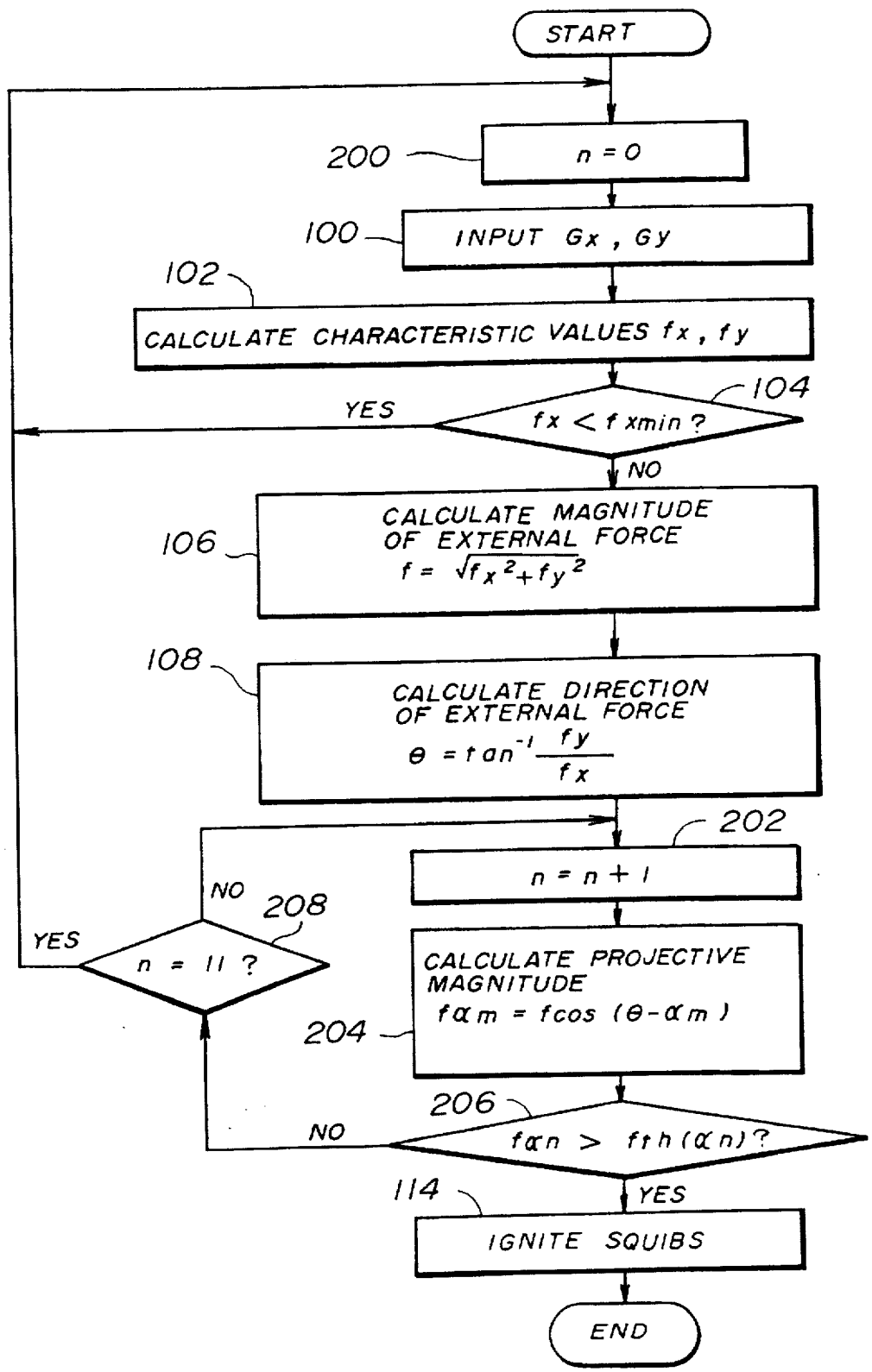
FIG. 9 is a flowchart of a process performed by the first embodiment of the present invention.

FIG. 9 is a flowchart of a process for determining the actuation of airbags in accordance with the threshold values $fth(\alpha n)$ shown in FIG. 8. In FIG. 9, steps which are the same as the steps shown in FIG. 5 are given the same reference numerals, and descriptions thereof will be omitted.

In the process shown in FIG. 9, step 200 is performed before step 100. In step 200, a variable n is set to "0" first. Thereafter, steps 100 to 108 are performed so as to calculate the magnitude f and direction $\Theta$ of the external force based on the feature values fx and fy. Then, the routine proceeds to step 202 to increment the variable n. The variable n corresponds to the suffix attached to $\alpha$ in FIG. 8. In the first execution of the routine, "1" is set to the variable n.

In the following step 204, the projective magnitude $f\alpha n$ is calculated for the direction $\alpha n$. It is then determined, in step 206, whether or not the projective magnitude $f\alpha n$ is greater than the corresponding threshold value $fth(\alpha n)$. If the projective magnitude $f\alpha n$ is greater than the corresponding threshold value $fth(\alpha n)$, the routine proceeds to step 114 to ignite the squibs 14b, 16b, 18b and 20b.

on the other hand, if it is determined, in step 206, that the projective magnitude $f\alpha n$ is not greater than the corresponding threshold value $fth(\alpha n)$, the routine proceeds to step 208. It is then determined, in step 208, whether or not the variable n is equal to "11". If the variable n is equal to "11", the routine returns to step 200. If it is determined that the variable n is not equal "11" to , the routine returns to step 202 to repeat steps 202 to 208 until the variable n becomes equal to "11".

As a result, if any one of the projective magnitudes $f\alpha n$ exceeds the corresponding threshold value $fth(\alpha n)$, a determination is made to inflate the airbags. Accordingly, a reliable determination on the actuation of the airbags can be achieved with a simple operation. Additionally, a quick determination can be achieved as compared to the conventional occupant restraint apparatus.

It is appreciated that a time period spent on determining the inflation of the airbags is required to be as short as possible. In the present embodiment, the time period for the determination is further reduced by setting the threshold values $fth(\alpha n)$ to appropriate values.

Figure 10:
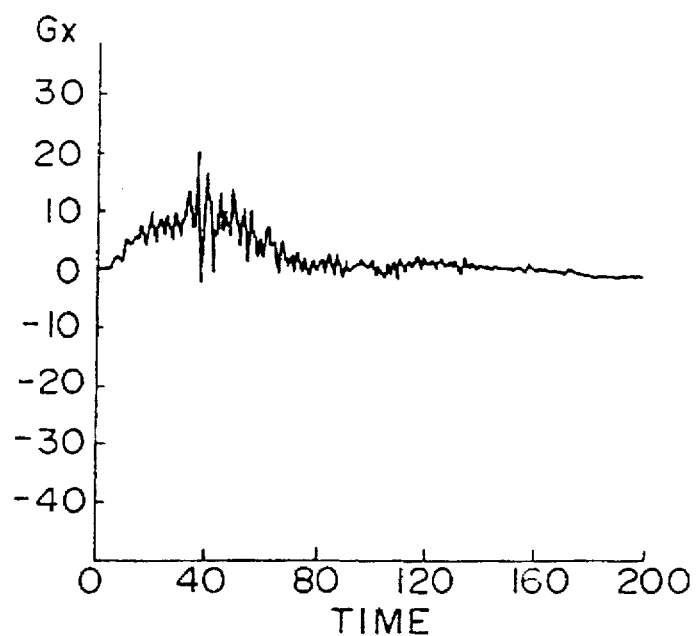
FIG. 10 is a graph showing variation in an x-component of an acceleration with respect to elapsed time when a small external force is exerted.
Figure 11:
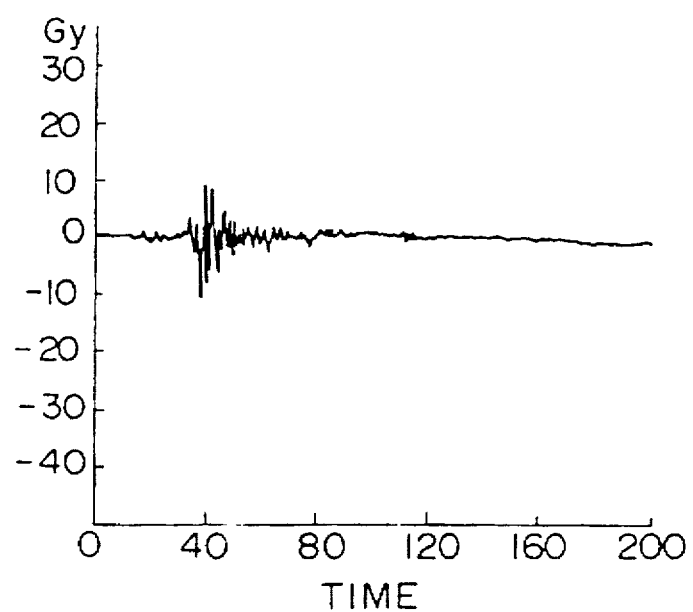
FIG. 11 is a graph showing variation in a y-component of the acceleration with respect to elapsed time when the small external force is exerted.

A description will now be given, with reference to FIGS. 10 to 29B, of a method of setting the appropriate values to the threshold values $fth(\alpha n)$. FIGS. 10 and 11 show variation in the x-component Gx and y-component Gy of the acceleration G with respect to elapsed time when the external force exerted on the vehicle 12 does not have a magnitude which requires the airbags to be actuated. The external force which is insufficient to actuate the airbags is hereinafter referred to as a small force.

Figure 12:
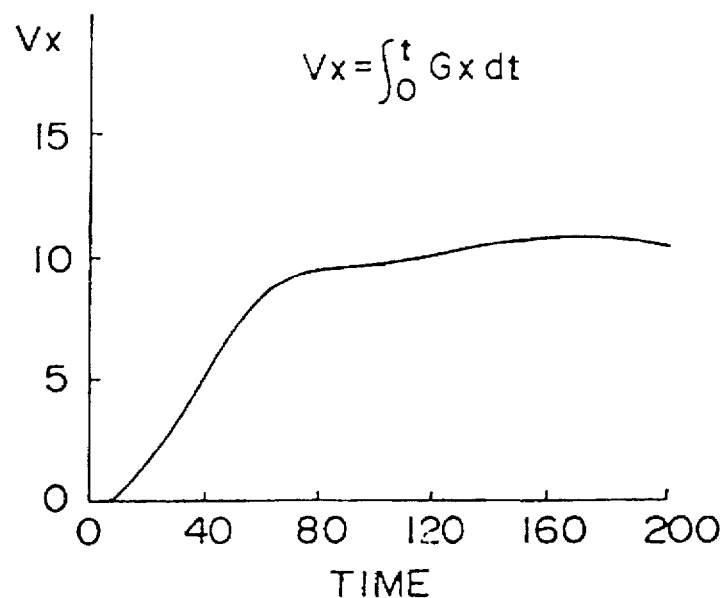
FIG. 12 is a graph showing variation in an x-component of a velocity with respect to elapsed time when the small external force is exerted.
Figure 13:
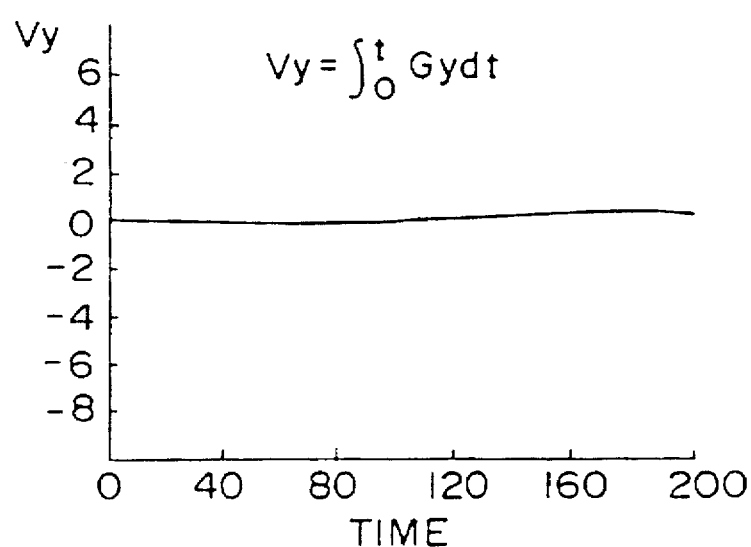
FIG. 13 is a graph showing variation in a y-component of the velocity with respect to elapsed time when the small external force is exerted.

FIGS. 12 and 13 show variation in the x-component Vx and y-component Vy of the velocity V with respect to elapsed time which is used as the feature values fx and fy in the process shown in FIG. 9. The x-component Vx and the y-component Vy are obtained by integration of Gx and Gy shown in FIGS. 10 and 11, respectively, by setting a start time to be the time when the external force begins to be exerted. Accordingly, the external force corresponding to the velocity V shown in FIGS. 12 and 13 is a small force.

Figure 14:
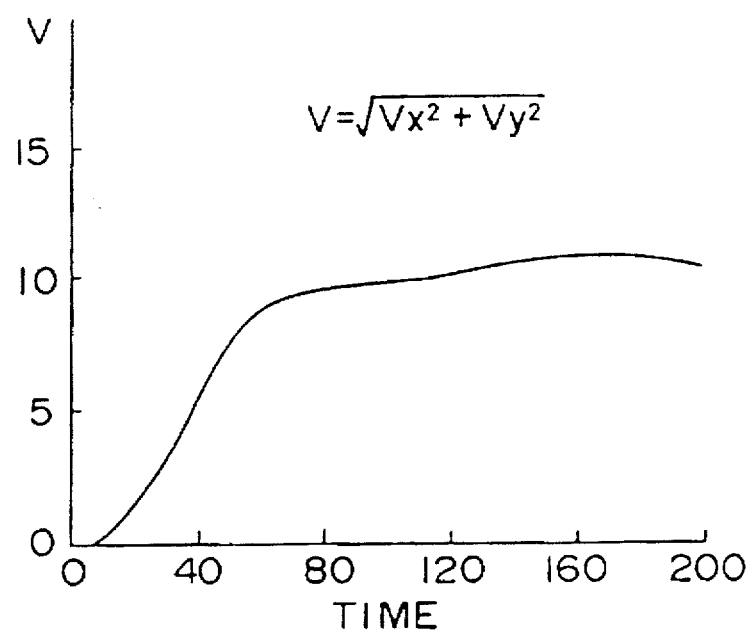
FIG. 14 is a graph showing variation in the magnitude of the velocity with respect to time elapse.
Figure 15:
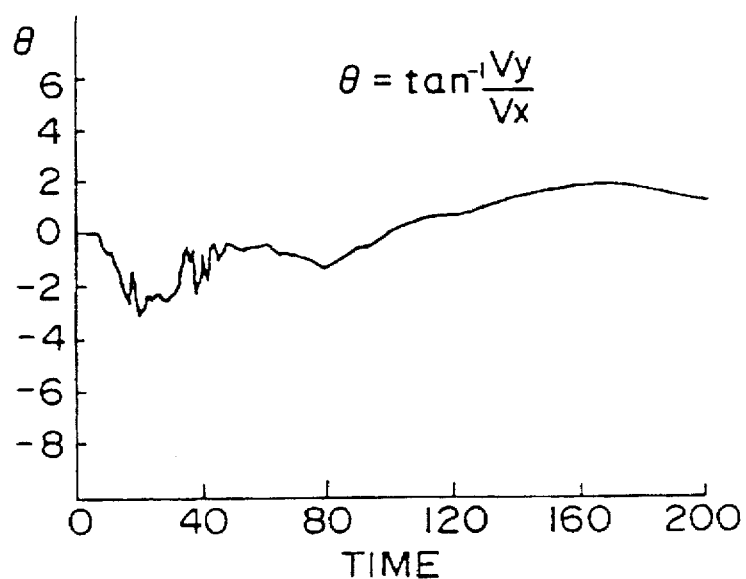
FIG. 15 is a graph showing variation in the direction of the velocity with respect to time elapse when the small external force is exerted.
Figure 16A:
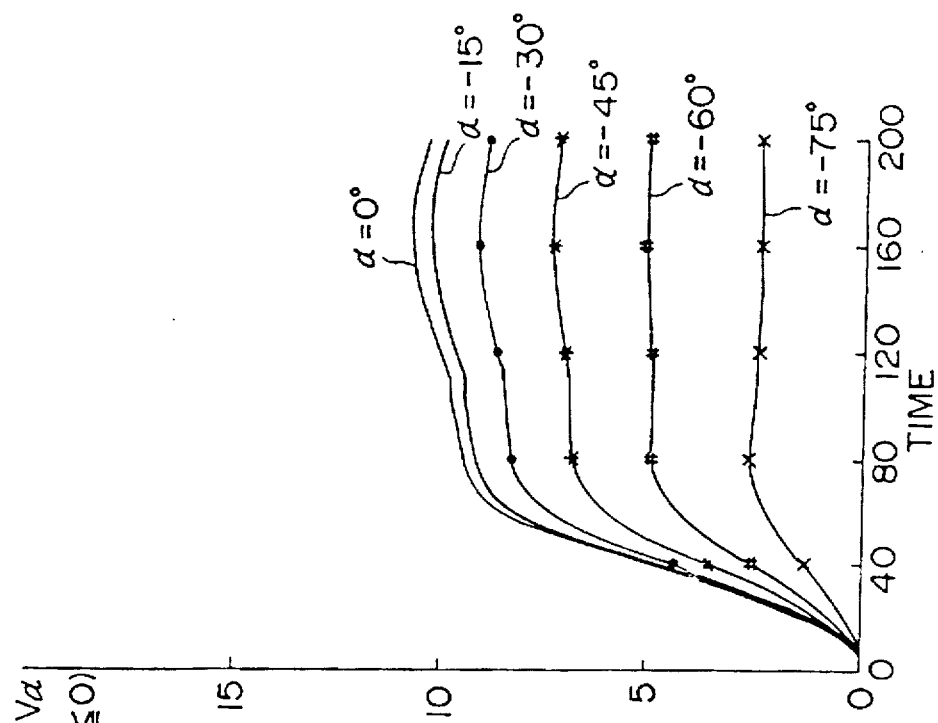
FIG. 16A and 16B are graphs showing variation in the projective magnitude of the velocity when the small external force is exerted.
Figure 16B:
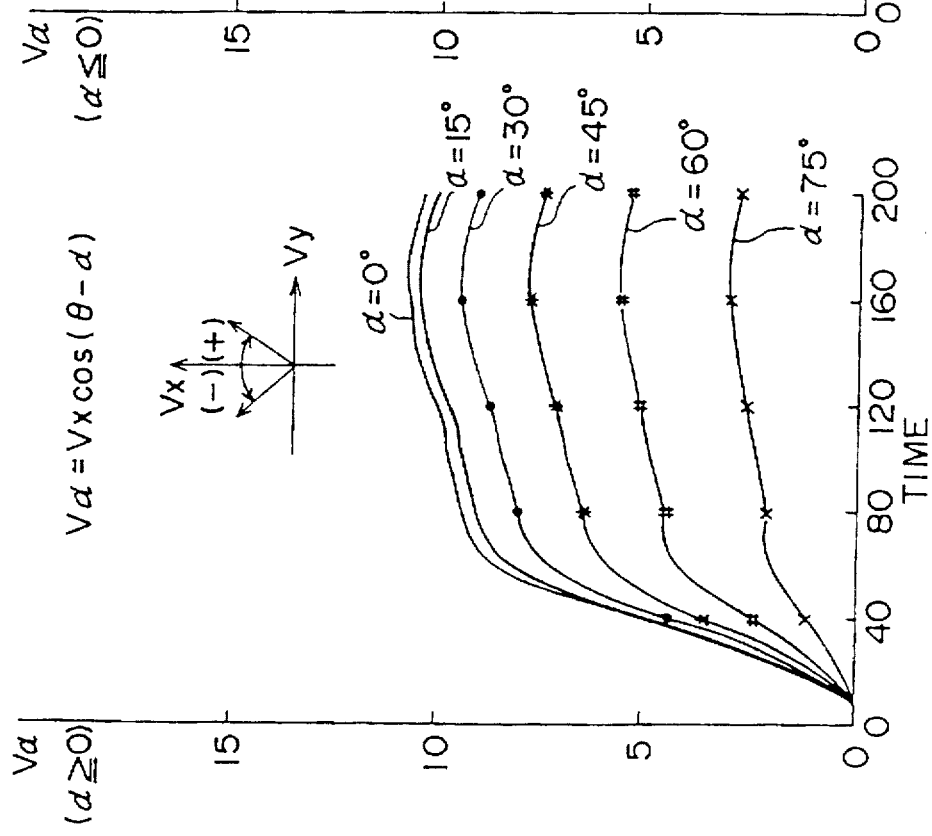

FIGS. 14 and 15 show variation in the magnitude and the direction $\Theta$ of the velocity V shown in FIG. 14 with respect to elapsed time calculated in accordance with Vx and Vy mentioned above, respectively. FIGS. 16A and 16B show variation in the projective magnitude $V\alpha$ with respect to elapsed time when the angle $\alpha$ is set to $\alpha 1$ to $\alpha 11$; FIG. 16A shows the case where $\alpha \geq 0$; FIG. 16B shows the case where $\alpha \leq 0$.

In this case, since the small force is exerted on the vehicle 12, each threshold value fth($\alpha$n) must be set to be greater than the corresponding projective magnitude V$\alpha$ shown in FIGS. 16A and 16B.

Figure 17:
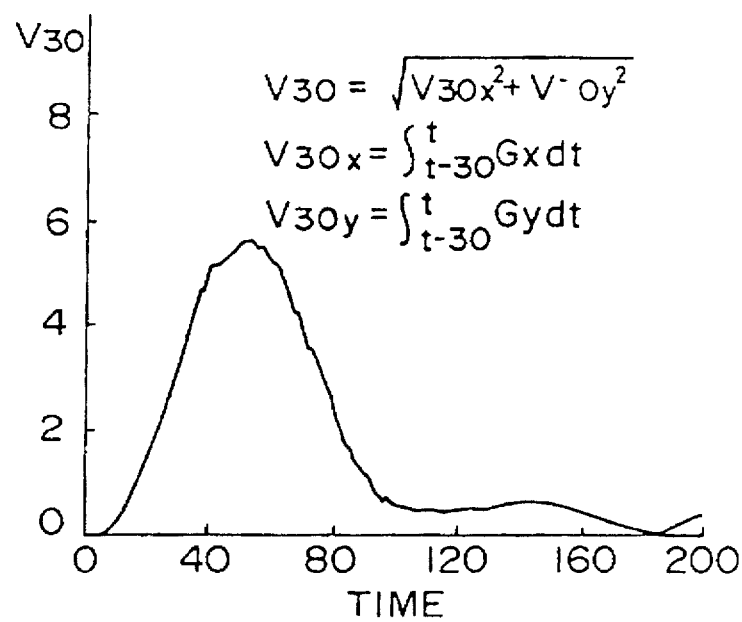
FIG. 17 is a graph showing variation in the magnitude of the velocity obtained by an interval integral with respect to elapsed time when the small external force is exerted.
Figure 18:
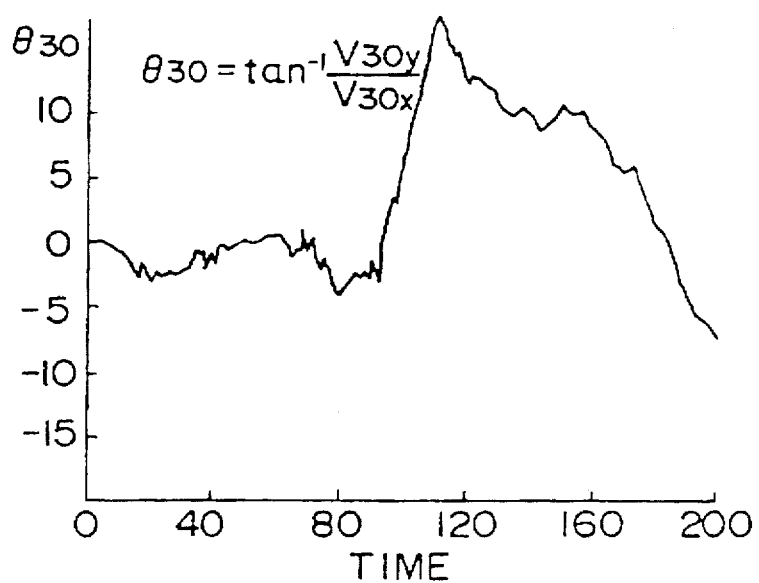
FIG. 18 is a graph showing variation in the direction of the velocity obtained by an interval integral with respect to elapsed time when the small external force is exerted.
Figure 19B:
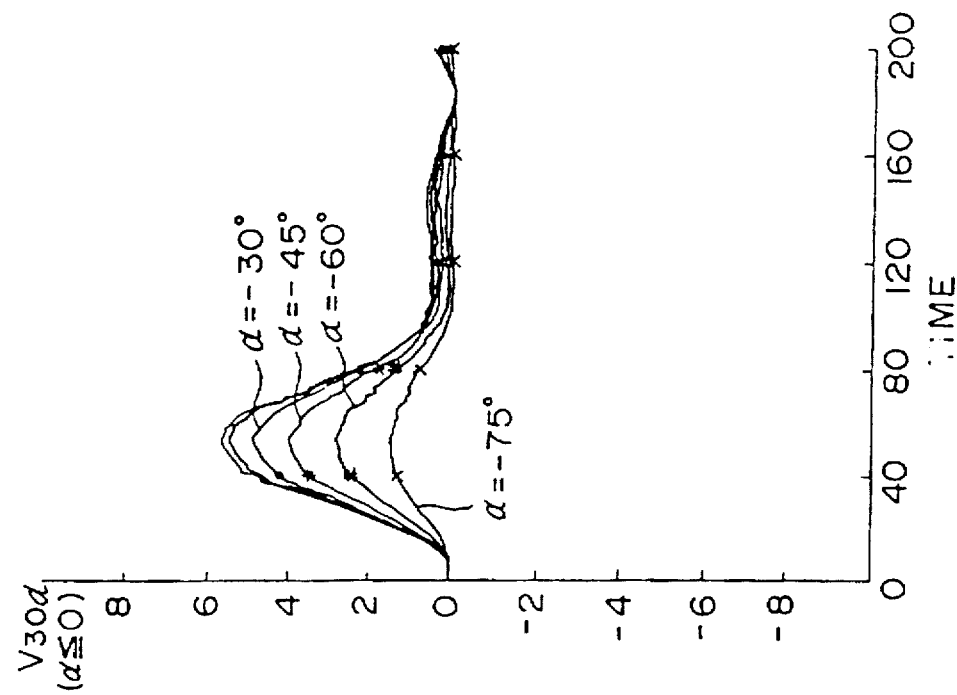
FIGS. 19A and 19B are graphs showing variation in the projective magnitude of the velocity obtained by an interval integral with respect to elapsed time when the small external force is exerted.
Figure 19A:
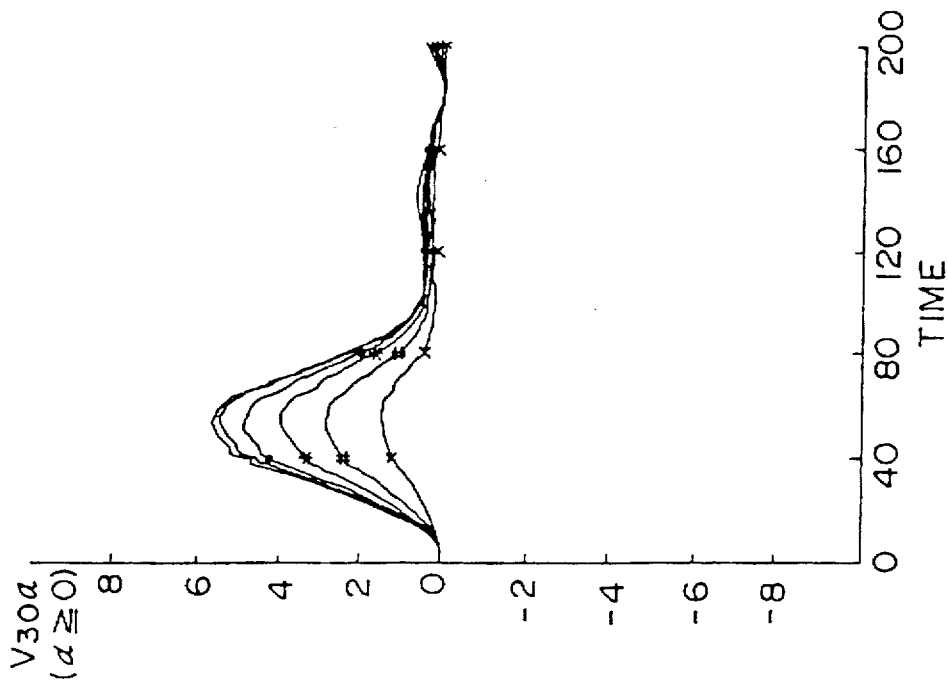

As previously mentioned, the feature value f can also be obtained by a time interval integration of Gx and Gy. FIGS. 17 and 18 show variation in the magnitude V30 and direction $\Theta$30 with respect to elapsed time, respectively. The magnitude V30 and the direction $\Theta$30 are calculated as interval integral on Gx and Gy with respect to an interval of 30 ms. FIGS. 19A and 19B show variation in the projective magnitude V30$\alpha$ with respect to elapsed time when the angle $\alpha$ is set to $\alpha 1$ to $\alpha 11$; FIG. 19A shows the case where $\alpha \geq 0$; FIG. 19B shows the case where $\alpha \leq 0$. In this case, since the small force is exerted on the vehicle 12, each threshold value fth($\alpha$n) must be set to be greater than the corresponding projective magnitude V30$\alpha$ shown in FIGS. 19A and 19B.

Figure 20:
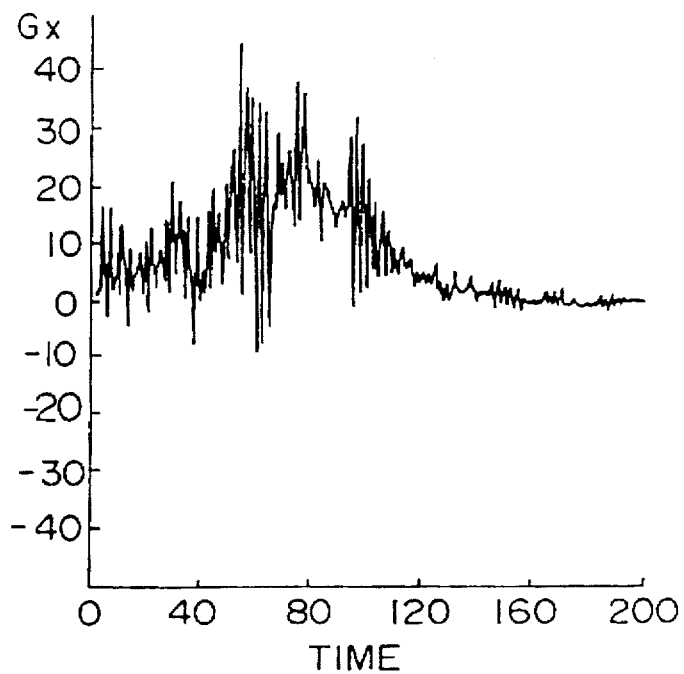
FIG. 20 is a graph showing variation in an x-component of an acceleration with respect to elapsed time when a large external force is exerted.
Figure 21:
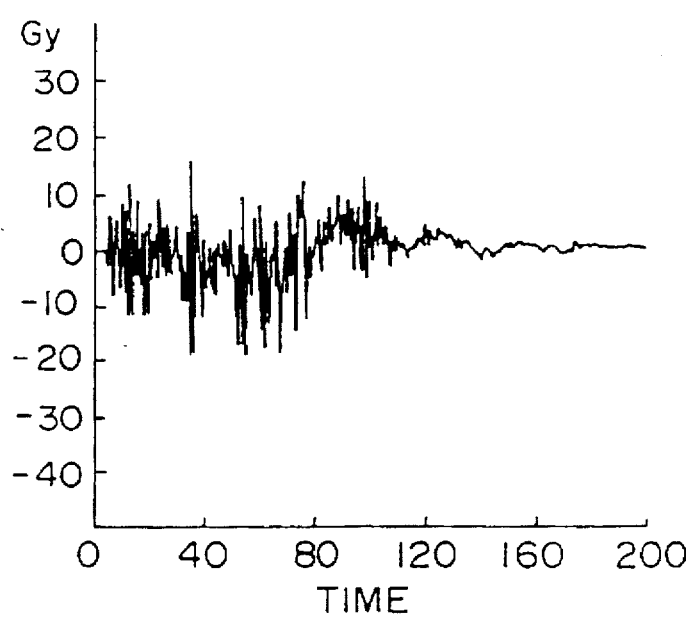
FIG. 21 is a graph showing variation in a y-component of the acceleration with respect to elapsed time when the large external force is exerted.

On the other hand, FIGS. 20 and 21 show variation in the x-component Gx and y-component Gy of the acceleration G with respect to elapsed time when the external force exerted on the vehicle has a magnitude which requires the airbags to be actuated. The external force which is sufficient to actuate the airbags is hereinafter referred to as a large force.

Figure 22:
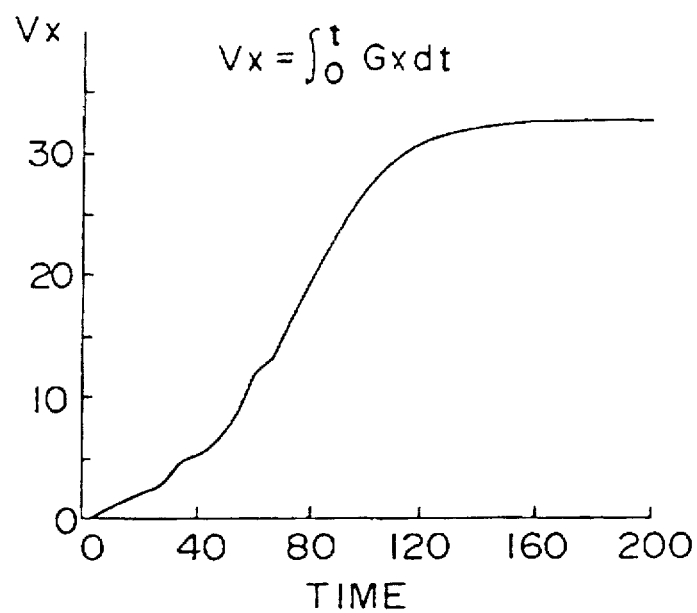
FIG. 22 is a graph showing variation in an x-component of a velocity with respect to elapsed time when the large external force is exerted.
Figure 23:
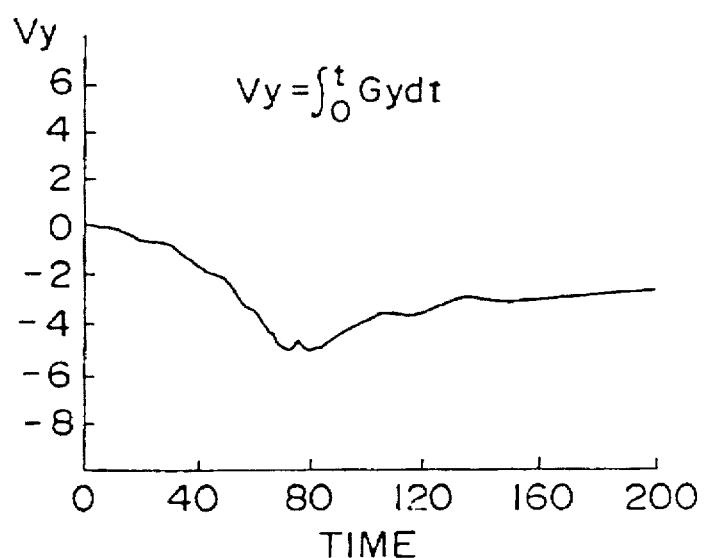
FIG. 23 is a graph showing variation in a y-component of the velocity with respect to elapsed time when the large external force is exerted.
Figure 24:
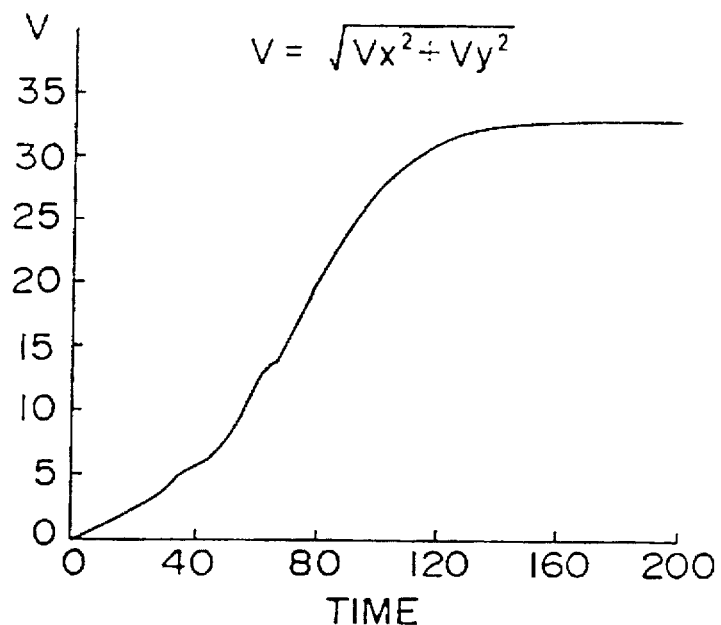
FIG. 24 is a graph showing variation in the magnitude of the velocity with respect to time elapse when the large external force is exerted.
Figure 25:
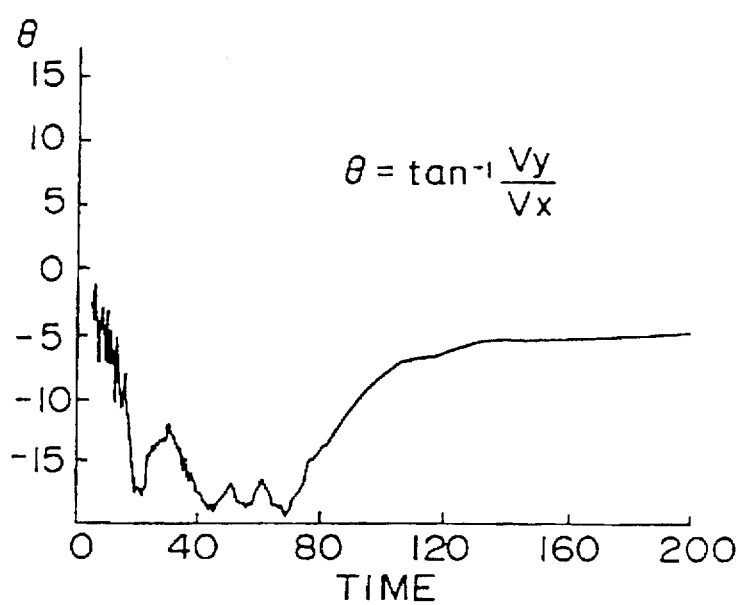
FIG. 25 is a graph showing variation in the direction of the velocity with respect to elapsed time when the large external force is exerted.
Figure 26B:
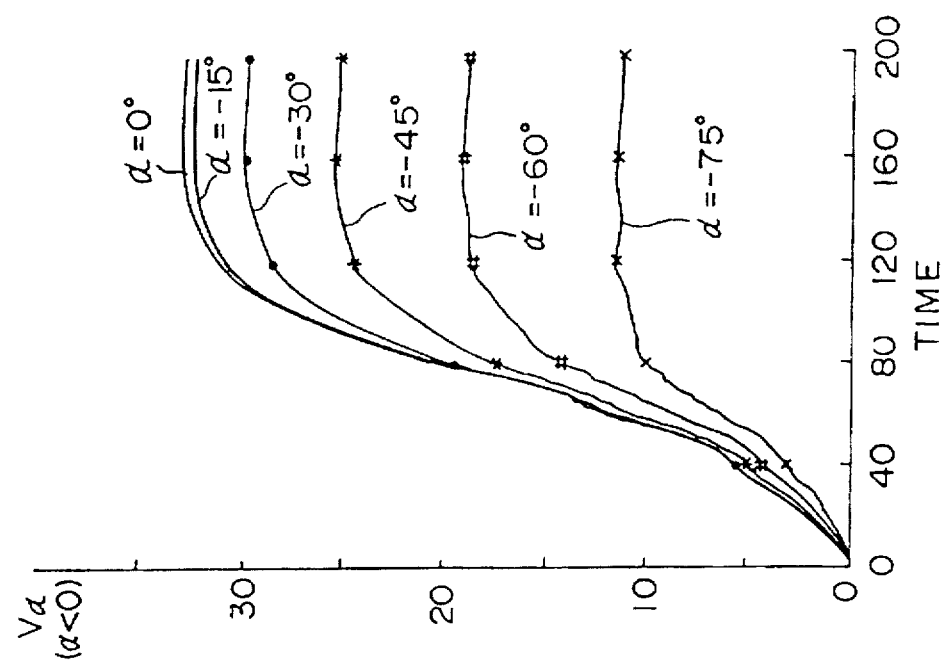
FIGS. 26A and 26B are graphs showing variation in the projective magnitude of the velocity when the small external force is exerted.
Figure 26A:
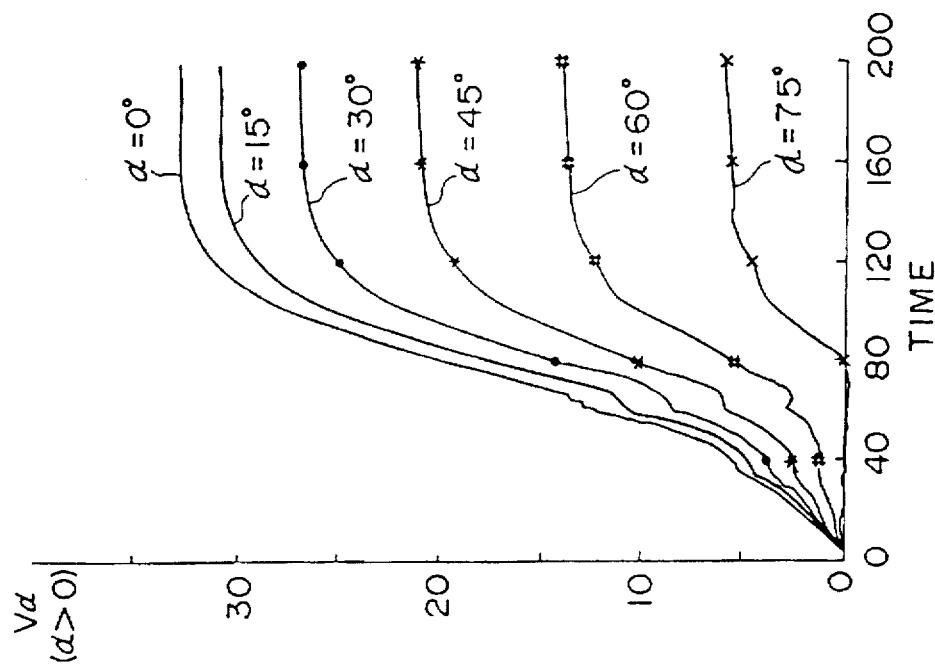

FIGS. 22 and 23 show variation in the x-component Vx and y-component Vy of the velocity V with respect to elapsed time which are obtained by Gx and Gy shown in FIGS. 20 and 21, respectively. FIGS. 24 and 25 show variation in the magnitude and the direction $\Theta$ of the velocity V shown in FIG. 24 with respect to elapsed time which are calculated in accordance with Vx and Vy mentioned above, respectively. FIGS. 26A and 26B show variation in the projective magnitude V30$\alpha$ with respect to elapsed time when the angle $\alpha$ is set to $\alpha 1$ to $\alpha 11$; FIG. 26A shows the case where $\alpha \geq 0$; FIG. 26B shows the case where $\alpha \leq 0$.

Figure 27:
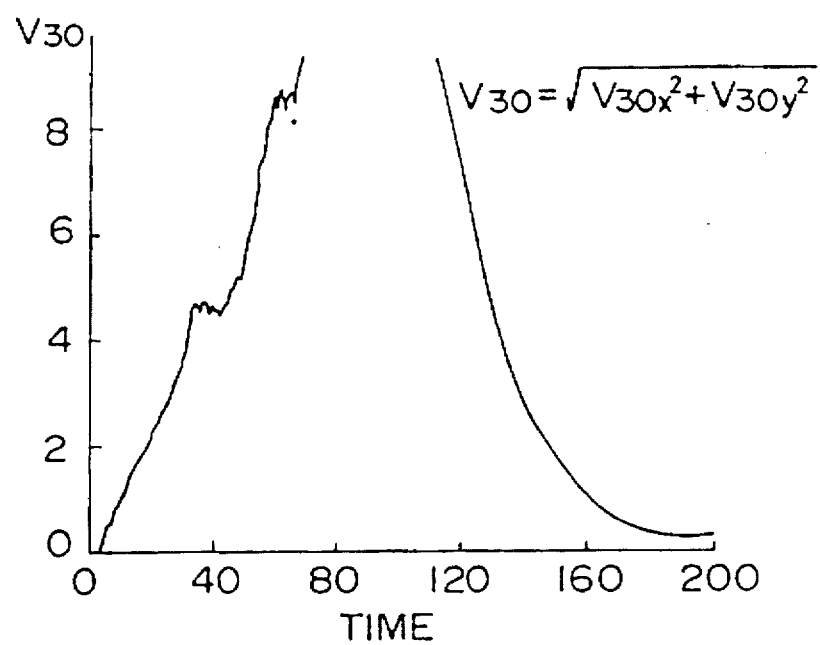
FIG. 27 is a graph showing variation in the magnitude of the velocity obtained by an interval integral with respect to elapsed when the large external force is exerted.
Figure 28:
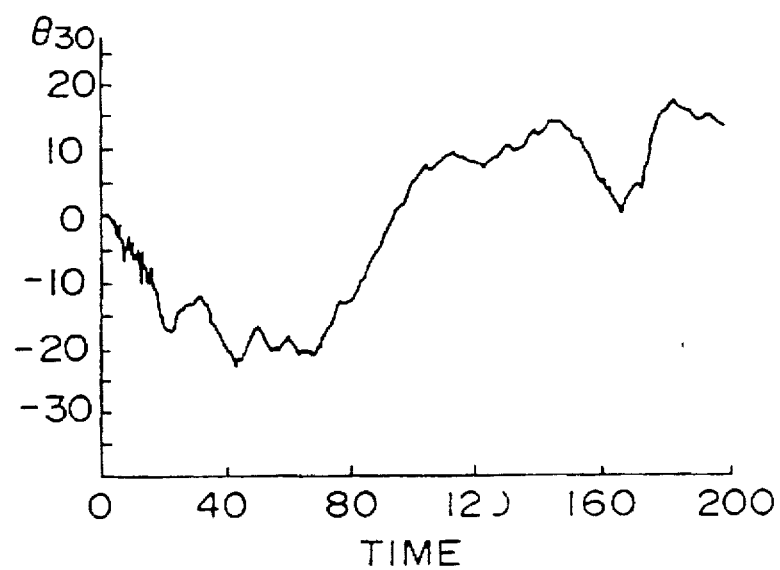
FIG. 28 is a graph showing variation in the direction of the velocity obtained by an interval integral with respect to elapsed time when the large external force is exerted.
Figure 29B:
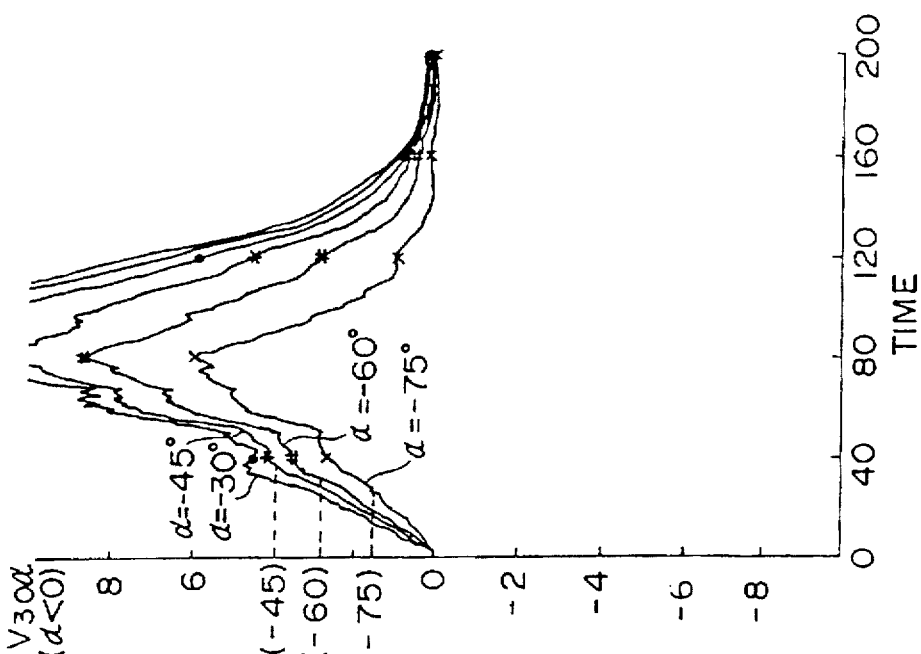
FIGS. 29A and 29B are graphs showing variation in the projective magnitude of the velocity obtained by an interval integral with respect to elapsed time when the large external force is exerted.
Figure 29A:
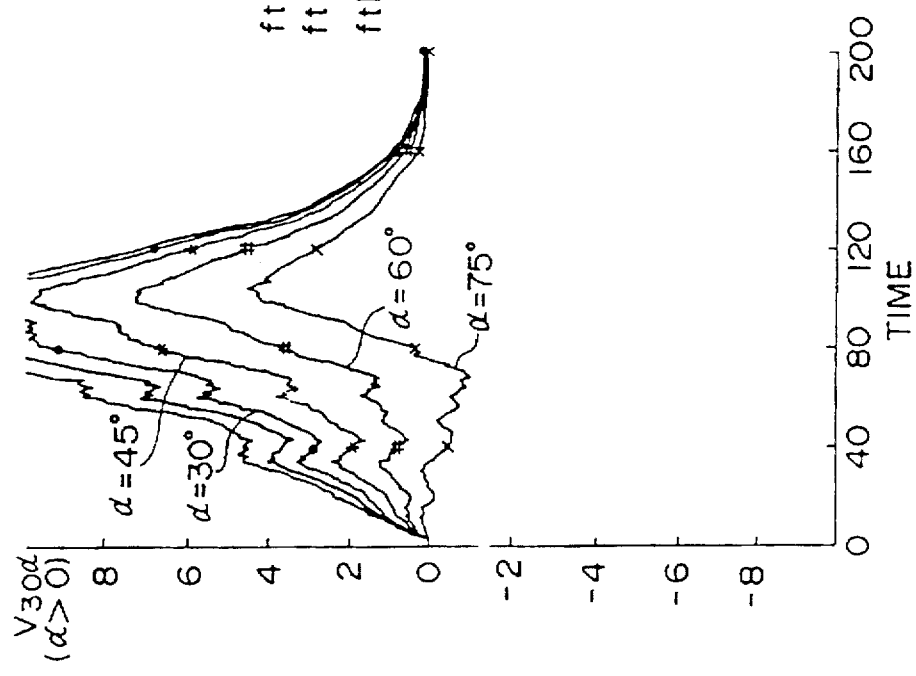

FIGS. 27 and 28 show variation in the magnitude V30 and direction $\Theta$30 with respect to time elapse, respectively. The magnitude V30 and the direction $\Theta$30 are calculated as a time interval integration of Gx and Gy with respect to an interval of 30 ms. FIGS. 29A and 29B show variation in the projective magnitude V30$\alpha$ with respect to elapsed time when the angle $\alpha$ is set from $\alpha 1$ to $\alpha 11$; FIG. 29A shows a case where $\alpha \geq 0$; FIG. 29B shows a case where $\alpha \leq 0$. In this case, since the large force is exerted on the vehicle 12, each threshold value fth($\alpha$n) must be set to be smaller than the corresponding projective magnitude V30$\alpha$ shown in FIGS. 29A and 29B.

When an external force is exerted on the vehicle 12, if the direction of the external force is not equal to 0 degree, the vehicle 12 is rotated due to a rotational force caused by the external force. If the external force is strong, the vehicle 12 is strongly rotated. If the external force is not so strong, there is little effect to the vehicle with respect to the rotation of the vehicle 12. Accordingly, if the external force exerted on the vehicle 12 is a large force, the vehicle 12 is strongly rotated, and if the external force is a small force, the vehicle 12 is barely rotated. Therefore, the projective magnitude V30$\alpha$ in FIG. 19A ($\alpha \geq 0$) and that shown in FIG. 19B ($\alpha \leq 0$) are almost a same since the external force is the small force. On the other hand, the projective magnitude V30$\alpha$ in FIG. 29A ($\alpha \geq 0$) is different from that shown in FIG. 29B ($\alpha \leq 0$) since the external force is a large force which causes rotation of the vehicle 12.

The above-mentioned phenomena indicates that change in the velocity in the left side ($\alpha$ is minus) is almost equal to that in the right side ($\alpha$ is plus) at the initial stage when a relatively small external force is exerted, while change in the velocity in the left side is significantly different from that in the right side at the initial stage when a relatively large force is exerted. A relatively sharp change (increase) is observed in either one of the left and right directions when the large force is exerted on the vehicle 12.

In the present embodiment, if the threshold value fth($\alpha$n) is set to be slightly greater than the maximum value of the projective magnitude V30$\alpha$n shown in FIGS. 19A and 19B, the projective magnitude V30$\alpha$n exceeds the corresponding threshold value fth($\alpha$n) at the angle $\alpha$ of $-75°$, $-60°$ and $-45°$ in FIG. 29B before a time period of 40 ms elapses. According to the process shown in FIG. 9, the determination to actuate the airbags is made if the projective magnitude V30$\alpha$n is greater than the corresponding threshold value fth($\alpha$n) at any one of the angles $\alpha 1$ to $\alpha 11$. Thus, a quick determination as to actuation of the airbags is achieved by considering rotation of the vehicle due to the external force applied in a direction oblique to the front-to-rear direction of the vehicle 12.

In the above-mentioned embodiment, the external force exerted on the vehicle 12 is determined by sensing the front-to-rear component and the side-to-side component of the acceleration generated in the vehicle 12. However, the directions of sensing the components are not limited to the front-to-rear direction and the side-to-side direction, and any directions may be selected if the external force can be calculated by synthesizing the components in such directions.

A description will now be given of a second embodiment of the present invention. The construction of the second embodiment is the same as that of the above-mentioned first embodiment as shown in FIG. 3. The first embodiment determines the actuation of the airbags in accordance with the projective magnitude which is obtained from the synthesized vector in accordance with the feature values fx and fy. However, the second embodiment does not use the vector calculation as in the first embodiment to perform the determination for actuation of the airbags.

Only one magnitude f and only one direction $\Theta$ is determined if the feature values fx and fy are determined, and only one threshold value fth($\Theta$) is also determined when the angle $\Theta$ is determined. This means that it is possible to prepare beforehand a table including determination information which indicates determination of whether or not the relationship $f=(fx^2+fy^2)^{1/2+1}>fth(\Theta)$ is satisfied for arbitrary feature values fx and fy. FIG. 30 is an illustration showing such a table. In the table shown in FIG. 30, "ON" indicates that the above relationship is satisfied and "OFF" indicates that the above relationship is not satisfied. The determination information in this table is prepared based on a decreased threshold value as an absolute value of fy is increased. Accordingly, the determination information indicates "ON" at a less value of fx when an absolute value of fy is increased.

Figure 31:
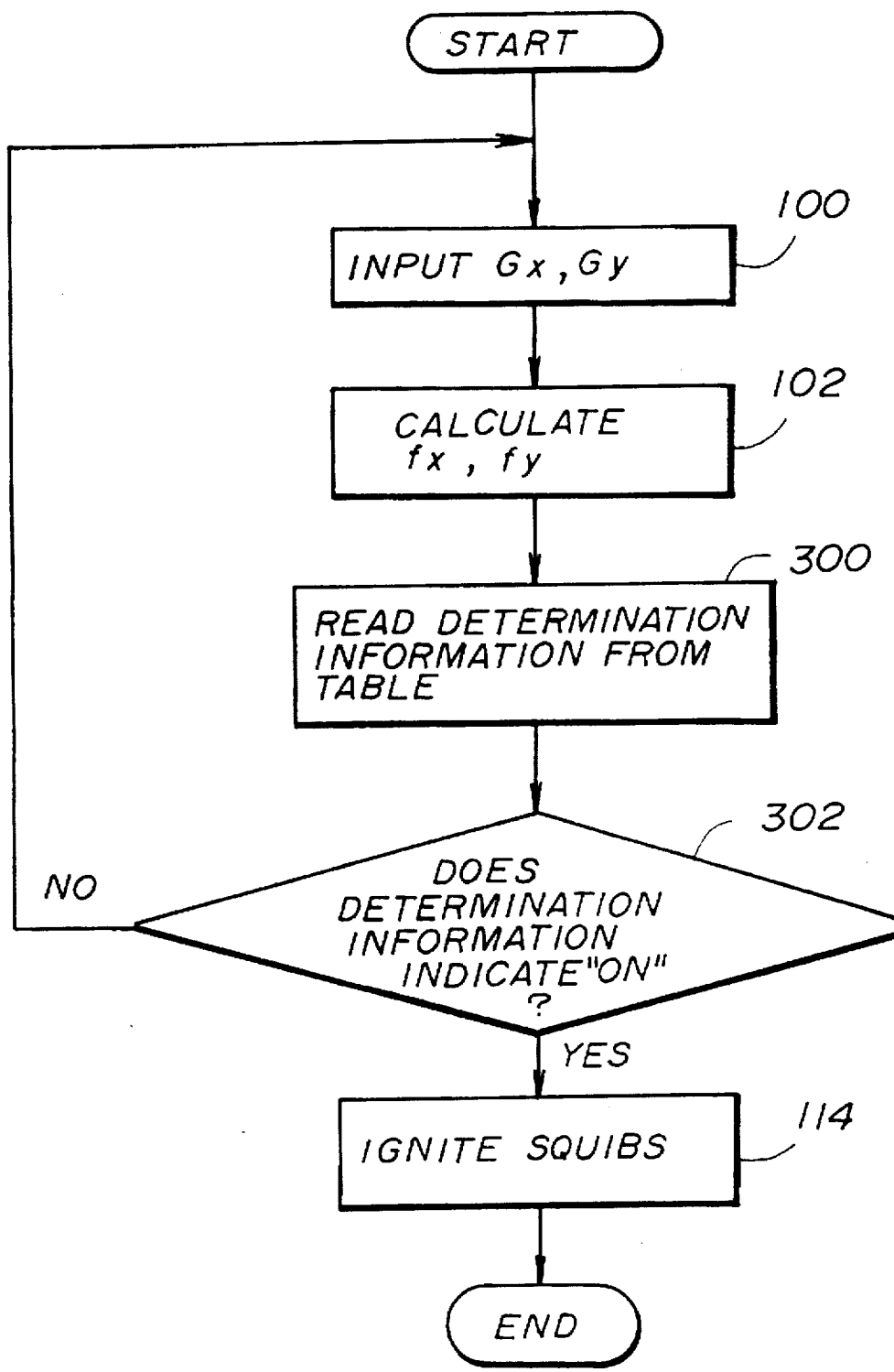
FIG. 31 is a flowchart of a process executed by a CPU of a second embodiment according to the present invention.

By searching the information in the table shown in FIG. 30 for the feature values fx and fy, determination as to the actuation of the airbags can be made without comparing, each time, the feature value with the threshold value fth($\Theta$). FIG. 31 is a flowchart of a process executed by the CPU 22$a$ of the second embodiment. In FIG. 31, steps which are the same as the steps shown in FIG. 5 are given the same reference numerals, and descriptions thereof will be omitted.

When the process shown in FIG. 31 is started, the feature values fx and fy are calculated according to Gx and Gy in steps 100 and 102. Then, a column (hereinafter referred to as a reference column) to be referred to in the table shown in FIG. 30 is determined, in step 300, in accordance with the feature value fy. The determination information is then read from the table at an intersection of the reference column and a row indicated by the feature value fx. It is then determined, in step 302, whether or not the determination information indicates "ON".

If it is determined that the determination information indicates "ON", the routine proceeds to step 114 to actuate the airbags and the routine is then ended. If it is determined that determination information does not indicate "ON", the routine proceeds to step 100 to repeat steps 100 to 302.

In the present embodiment, the determination of the actuation of the airbags can be made by referring to the table prepared beforehand without performing complex calculation. Thus a reliable determination can be made with a simple operation.

In the present embodiment, the determination of the actuation of the airbags may be made in accordance with a two-dimensional map in which the threshold value fxth is changed stepwise according to a value of fy. In such a case, a column to be referred to in the two-dimensional map is determined first according to the value of fy. It is then determined whether or not fx is greater than fxth. If fx is greater than fxth, a determination is made to actuate the airbags.

It should be noted that, in the present invention, the airbags 14, 16, 18 and 20 are provided as occupant restraining means. However, in an alternative, other device such as a preloader which unwind an excessive length of seat belt may be provided as the occupant restraining means.

The present invention is not limited to the specifically disclosed embodiments, and variations and modifications may be made without departing from the scope of the present invention.

What is claimed is:

1. An occupant restraint system for a vehicle, an acceleration being generated on said vehicle when an external force is exerted on said vehicle, said occupant restraint system comprising:

restraining means for restraining a passenger in said vehicle when said external force exceeds a predetermined value;

external force assuming means for assuming a magnitude and a direction of the external force exerted on said vehicle;

projective magnitude calculating means for calculating a projective magnitude of a projective vector obtained from an external force vector corresponding to the external force, said external force vector obtained from the magnitude and the direction assumed by said external force assuming means, said projective vector being a projection of said external force vector with respect to a predetermined direction; and actuation determining means for determining actuation of said restraining means by comparing said projective magnitude with a predetermined threshold value so that said restraining means is actuated when said projective magnitude is greater than said predetermined threshold value.

2. The occupant restraint system as claimed in claim 1, wherein said external force assuming means comprises:

first feature value extracting means for extracting a first feature value from a first component of said acceleration in a first direction, said first feature value representing a first vector of said external force with respect to said first direction;

second feature value extracting means for extracting a second feature value from a second component of said acceleration in a second direction different from said first direction, said second feature value representing a second vector of said external force with respect to said second direction; and synthesized vector calculating means for calculating a magnitude and a direction of a synthesized vector which is obtained by synthesizing said first vector and said second vector, said synthesized vector corresponding to said external force vector.

3. The occupant restraint system as claimed in claim 2 wherein said first feature value and said second feature value are extracted by integration of said first component and said second component of said acceleration with respect to time, respectively.

4. The occupant restraint system as claimed in claim 2, wherein said first feature value and said second feature value are extracted by n times integration of said first component and said second component of said acceleration with respect to time, where the n is an integer greater than 1.

5. The occupant restraint system as claimed in claim 2, wherein said first feature value and said second feature value are extracted by a time interval integration of said first component and said second component of said acceleration with respect to time.

6. The occupant restraint system as claimed in claim 2, wherein said first direction corresponds to a front-to-rear direction of said vehicle and said second direction corresponds to a side-to-side direction of said vehicle.

7. The occupant restraint system as claimed in claim 2, wherein said projective magnitude calculating means calculates said projective magnitude for a plurality of predetermined directions, and said actuation determining means compares each calculated projective magnitude with the corresponding threshold value determined for each of said predetermined directions, a determination to actuate said restraining means being made when said projective magnitude exceeds the corresponding threshold value at any one of said predetermined directions.

8. The occupant restraint system as claimed in claim 7, wherein said predetermined directions are defined in a range from minus 90 degrees to plus 90 degrees with respect to a front-to-rear direction of said vehicle, said range divided into uniform intervals.

9. The occupant restraint system as claimed in claim 8, wherein said intervals are 15 degrees.

* * * * *